United States Patent
Cosenza et al.

(10) Patent No.: US 8,506,224 B2
(45) Date of Patent: Aug. 13, 2013

(54) CAPTIVE PANEL FASTENER ASSEMBLY

(75) Inventors: Frank Cosenza, Santa Barbara, CA (US); Luke Haylock, Culver City, CA (US); Rodrigo Pinheiro, Riverside, CA (US); Edgar Frias, Huntington Beach, CA (US)

(73) Assignee: Alcoa Inc., Pittsburgh, PA (US)

(*) Notice: Subject to any disclaimer, the term of this patent is extended or adjusted under 35 U.S.C. 154(b) by 287 days.

(21) Appl. No.: 13/159,584

(22) Filed: Jun. 14, 2011

(65) Prior Publication Data
US 2012/0027537 A1 Feb. 2, 2012

Related U.S. Application Data

(60) Provisional application No. 61/397,617, filed on Jun. 14, 2010, provisional application No. 61/397,618, filed on Jun. 14, 2010.

(51) Int. Cl.
*F16B 21/18* (2006.01)
(52) U.S. Cl.
USPC ........... 411/353; 411/383; 411/424; 411/517; 411/521; 411/943
(58) Field of Classification Search
USPC ................. 411/347, 353, 383, 411, 424, 517, 411/521, 533, 541, 943
See application file for complete search history.

(56) References Cited

U.S. PATENT DOCUMENTS

| | | | |
|---|---|---|---|
| 1,595,054 A * | 8/1926 | Ballou, Jr. ...................... | 411/353 |
| 2,282,360 A * | 5/1942 | Horrocks ...................... | 411/553 |
| 2,729,126 A * | 1/1956 | Stanton, Jr. et al. .......... | 269/137 |
| 2,865,076 A * | 12/1958 | Newton et al. ............... | 411/347 |
| 3,217,774 A * | 11/1965 | Pelochino .................... | 411/353 |
| 4,464,090 A | 8/1984 | Duran | |
| 4,844,677 A | 7/1989 | Schwartzman | |
| 5,073,070 A | 12/1991 | Chang | |

(Continued)

FOREIGN PATENT DOCUMENTS

FR 2741916 A1 6/1997

OTHER PUBLICATIONS

International Search Report and Written Opinion issued in connection with Applicants' International Application No. PCT/US2011/040295 (10 pages).

(Continued)

*Primary Examiner* — Roberta Delisle
(74) *Attorney, Agent, or Firm* — Greenberg Traurig, LLP

(57) ABSTRACT

A fastener including a bolt and a grommet assembly attached to the bolt for fastening to a work piece. The grommet assembly includes an upper grommet, a lower grommet attached to the upper grommet, a retainer ring, and a housing that houses the retainer ring within the lower grommet. The upper grommet is inserted into a hole at one side of the work piece and the lower grommet is attached to the upper grommet through the hole at an opposite side of the work piece. The retainer ring is inserted into the lower grommet and encapsulated by the housing. The bolt is inserted into the grommet assembly, and the retainer ring engages the bolt such that a plurality of pressure pads extending from a plurality of corresponding spring beam elements of the retainer ring reside in an annular groove of the bolt. The grommet assembly captivates the bolt onto the work piece, while providing a positive hold out of the bolt.

19 Claims, 23 Drawing Sheets

(56) References Cited

U.S. PATENT DOCUMENTS

| | | | |
|---|---|---|---|
| 5,537,844 A | | 7/1996 | Maclean |
| 5,673,920 A | * | 10/1997 | Mockenhaupt ............... 277/630 |
| 5,951,081 A | * | 9/1999 | Foster et al. ................. 295/36.1 |
| 6,860,673 B2 | * | 3/2005 | Zaps ............................ 403/344 |
| 7,021,876 B2 | * | 4/2006 | Gulistan ....................... 411/353 |
| 7,377,735 B2 | * | 5/2008 | Cosenza et al. ............... 411/517 |
| 2008/0056844 A1 | * | 3/2008 | Aukzemas et al. ........... 411/353 |

OTHER PUBLICATIONS

International Search Report and Written Opinion issued in connection with Applicants' International Application No. PCT/US2011/039978 (10 pages).

U.S. Appl. No. 13/157,784, filed Jun. 10, 2011 on "Retainer Ring" (36 pages).

* cited by examiner

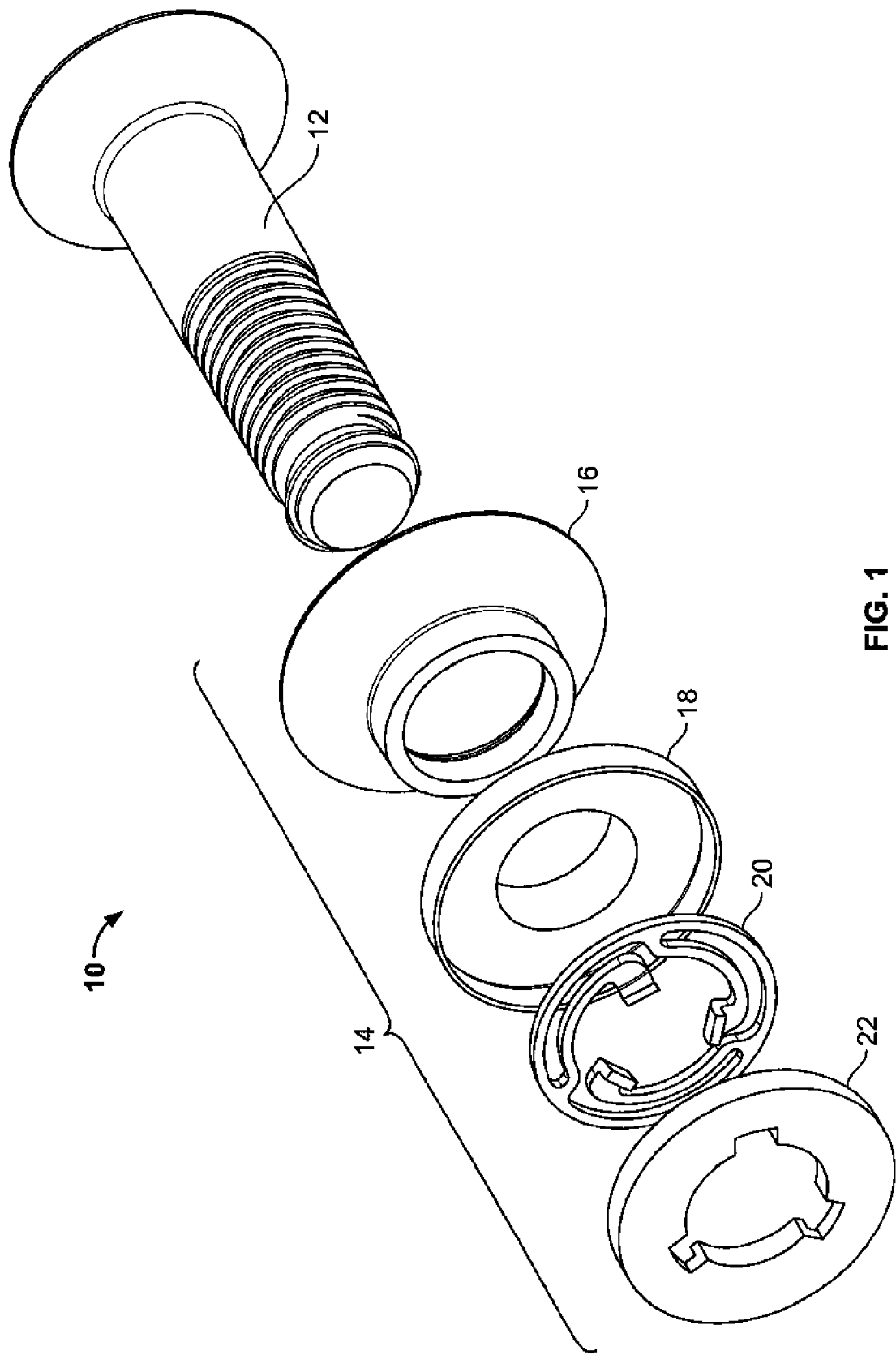

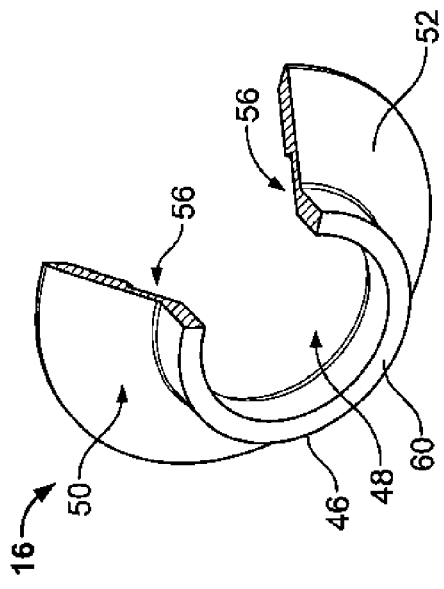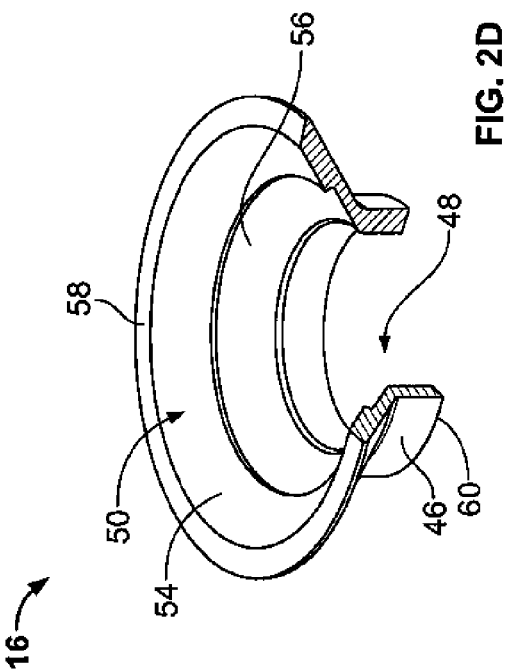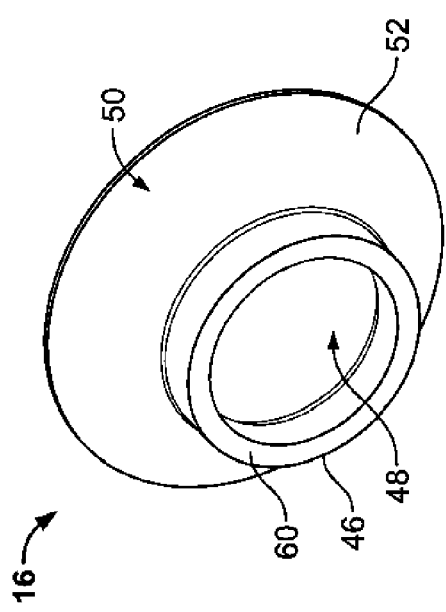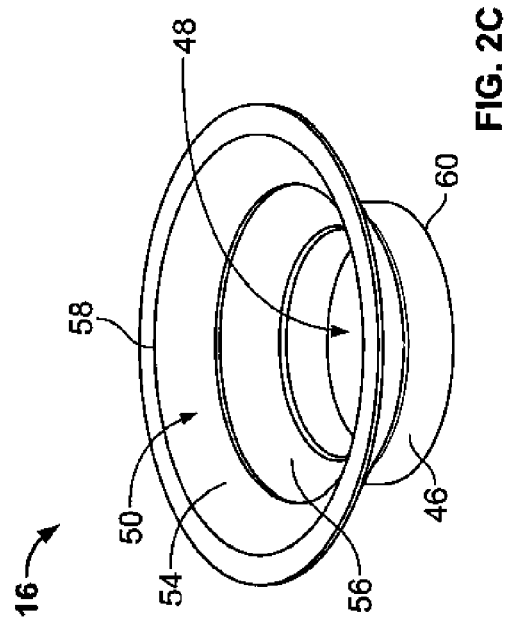

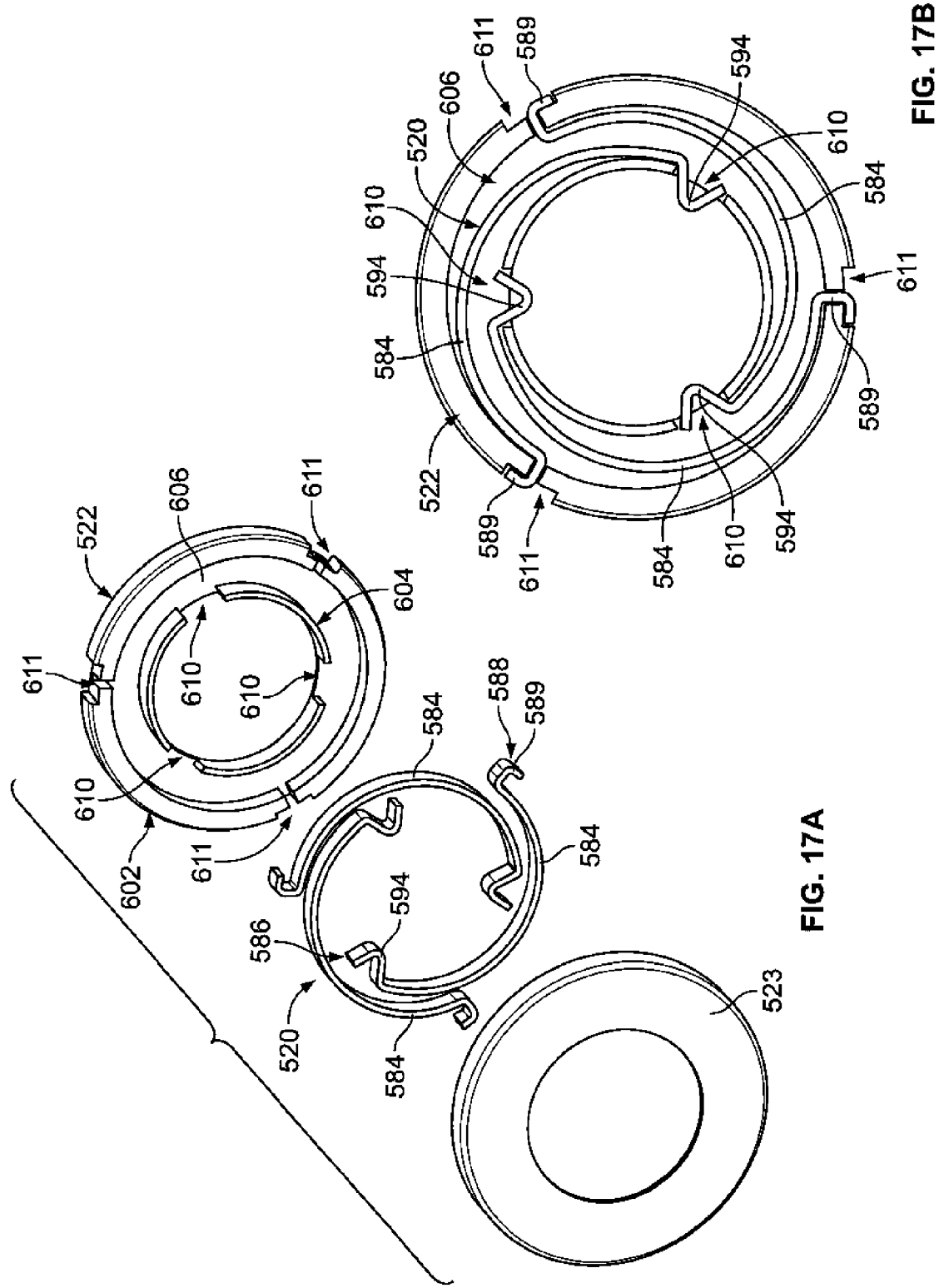

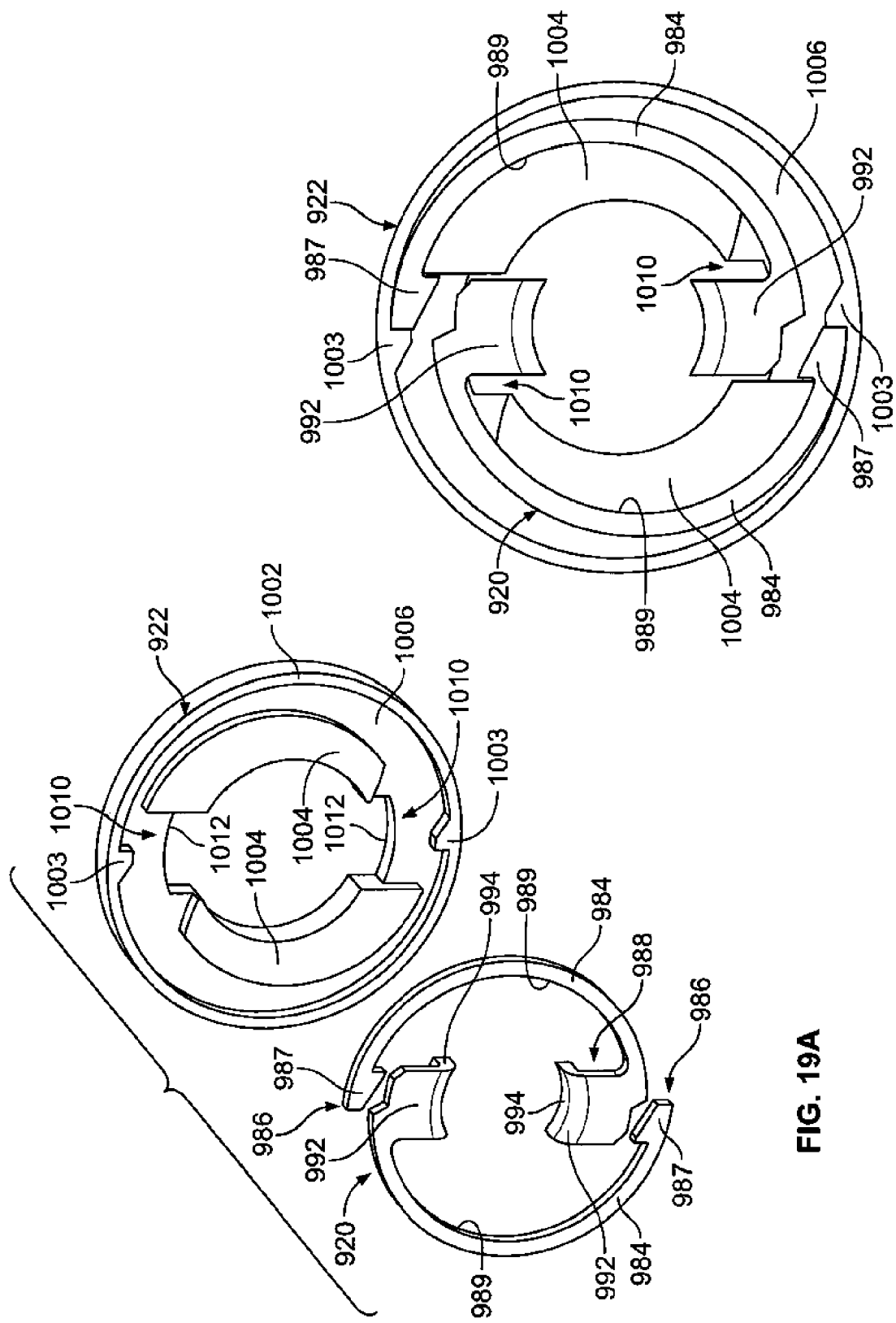

CAPTIVE PANEL FASTENER ASSEMBLY

CROSS-REFERENCE TO RELATED APPLICATION

This application is a Section 111(a) application relating to and claims the benefit of commonly owned U.S. Provisional Application Ser. No. 61/397,617 entitled "CAPTIVE PANEL FASTENER ASSEMBLY", filed Jun. 14, 2010 and U.S. Provisional Patent Application Ser. No. 61/397,618 entitled "RETAINER RING," filed Jun. 14, 2010, the entireties of which are incorporated herein by reference.

FIELD OF THE INVENTION

The present invention relates to fasteners and, more particularly, to captive panel fastener assemblies.

BACKGROUND OF THE INVENTION

In certain applications, it is desirable to retain (i.e., captivate) a bolt, screw or the like onto a structure while providing the ability to hold the bolt in a position where a head of the bolt is held away from the structure (i.e., in a hold-out position). In addition, grommets have been used as hole liners to protect the structure from fastener usage and wear. What is needed is a fastener that facilitates captivation and bolt hold-out in conjunction with a grommet.

SUMMARY OF THE INVENTION

In an embodiment, a fastener including a bolt having an elongated shank portion adapted to be positioned within an opening of a work piece, the work piece having a first side and a second side opposite the first side, the elongated shank portion having a first end, a second end opposite the first end, a head formed at the first end, a threaded portion having a plurality of external bolt threads, the threaded portion being adapted to extend past the second side of the work piece, and an annular groove formed proximate to the second end; an upper grommet having a receptacle and a head extending from the receptacle, the head of the upper grommet having an exterior surface, an interior surface, and an annular pocket formed within the interior surface, wherein the upper grommet is adapted to be installed within the opening of the work piece; a lower grommet having a tubular portion with a first end and a second end opposite the first end of the tubular portion, a flared portion extending from the first end of the tubular portion, and a base member extending from the second end of the tubular portion, the base member including an interior portion, wherein the lower grommet is adapted to be installed within the upper grommet, such that the receptacle of the upper grommet is sized and shaped to receive the tubular portion of the lower grommet, and the annular pocket of the head of the upper grommet is sized and shaped to receive the flared portion of the lower grommet; a housing; and a retainer ring housed within the housing, wherein the interior portion of the base member of the lower grommet is sized and shaped to receive the housing, and wherein the elongated shank portion of the bolt is adapted to be installed within the upper grommet and lower grommet, such that the retainer ring engages the annular groove of the bolt in order to captivate the bolt.

In an embodiment, a grommet assembly, which includes the upper grommet and the lower grommet, the retainer ring, and the housing, captivates the bolt onto the work piece, while providing a positive hold out of the bolt, i.e., where the head of the bolt is held away from the work piece. In an embodiment, the bolt is a solid piece and contains no hollow portions; and, therefore, the full strength of the bolt may be utilized.

In an embodiment, the captive panel fastener may be used with access panels, such as those found on commercial or military aircraft. In other embodiments, the fastener may be used with any type of suitable panels, structures, or work pieces and in other types of fields and applications.

BRIEF DESCRIPTION OF THE DRAWINGS

Reference is made to the following detailed description of the embodiments considered in conjunction with the accompanying drawings, in which:

FIG. 1 is an exploded perspective view of a captive panel fastener in accordance with an embodiment of the invention;

FIGS. 2A through 2D are bottom and top perspective views of an upper grommet employed by the captive panel fastener shown in FIG. 1;

FIGS. 17A and 17B show another embodiment of a retainer ring and its associated housing;

FIGS. 19A and 19B show another embodiment of a retainer ring and its associated housing.

DETAILED DESCRIPTION OF THE DRAWINGS

Figure 1A:
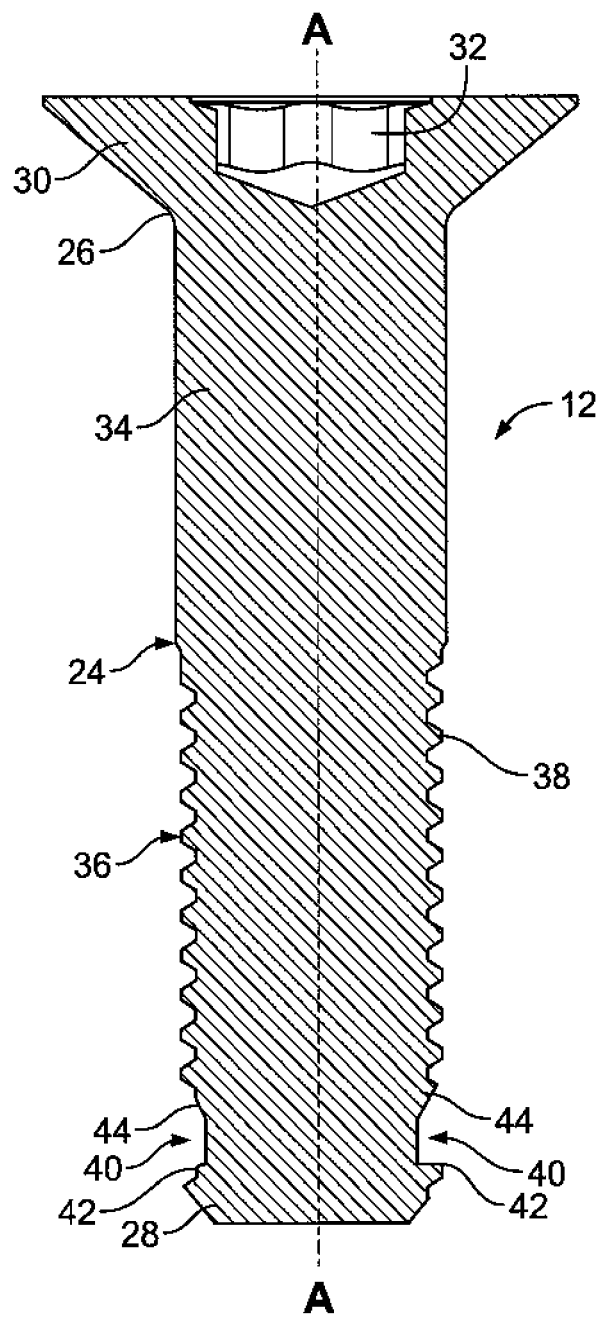
FIG. 1A is a cross sectional view of a bolt employed by the captive panel fastener shown in FIG. 1.
Figure 3B:
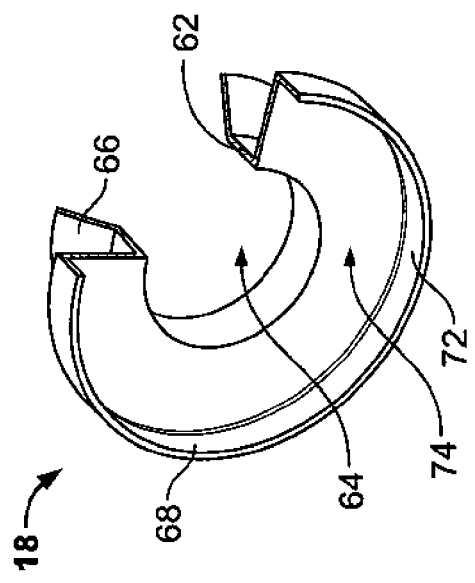
FIGS. 3A through 3D are bottom and top perspective views of a lower grommet employed by the captive panel fastener shown in FIG. 1.
Figure 3D:
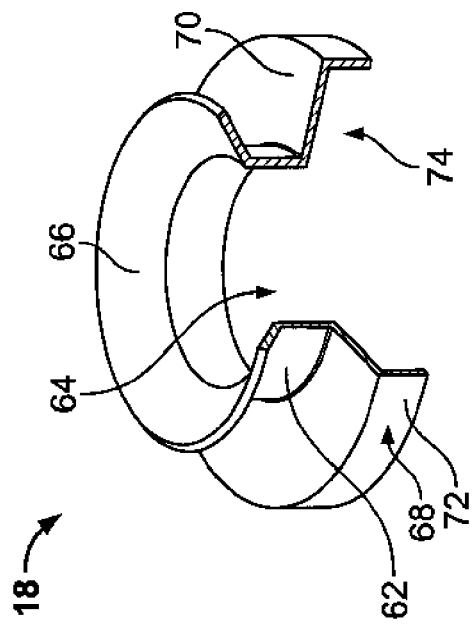
Figure 3A:
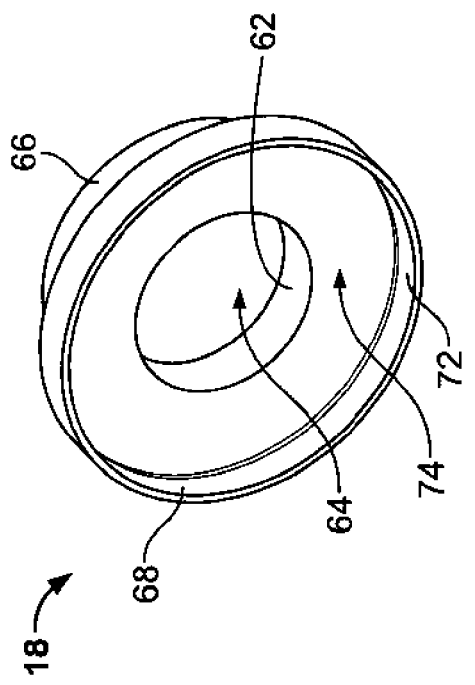
Figure 3C:
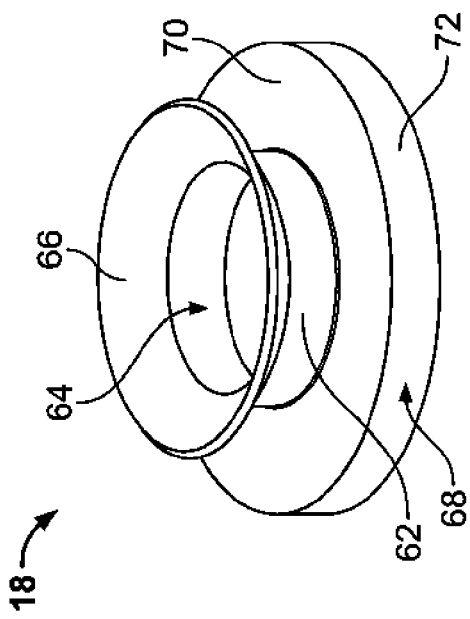

Referring to FIG. 1, a captive panel fastener 10 includes a bolt 12 and a grommet assembly 14 attached to the bolt 12. In an embodiment, the grommet assembly 14 includes an upper grommet 16, a lower grommet 18, a retainer ring 20, and a housing 22. The bolt 12 and the grommet assembly 14 shall be described in more detail below.

Referring to FIG. 1A, in an embodiment, the bolt 12 includes an elongated shank portion 24 having a first end 26 and a second end 28 opposite the first end 26, and a head 30 formed at the first end 26. In an embodiment, the head 30 consists of a countersunk head. In other embodiments, the head 30 may consist of a protruding head or any other type of head-shape and size known in the art. In an embodiment, the head 30 includes a drive 32 that is sized and shaped to receive a drive tool, such as a wrench, a screwdriver, or the like. In an embodiment, the drive 32 can consist of any shape and size known in the art. In an embodiment, the shank portion 24 includes a substantially smooth, cylindrical-shaped portion 34 and a threaded portion 36 having a plurality of external threads 38. In an embodiment, the threads 38 are helical. In other embodiments, the threads 38 may include any other type of thread form known in the art. In an embodiment, the smooth, cylindrical portion 34 need not be included, and the threads 38 can extend substantially the entire length of the shank portion 24. In an embodiment, the threaded portion 38 includes an annular groove 40 formed proximate to the second end 28 thereof. In an embodiment, the annular groove 40 is coincident with the threads 38. In an embodiment, the bolt 12 includes threads 38 below the annular groove 40 and proximate to the second end 28. In an embodiment, the annular groove 40 is defined by a first annular portion 42 that extends approximately perpendicular to the longitudinal axis A-A of the bolt 12, and a second ramped portion 44 that extends angularly from the longitudinal axis A-A of the bolt 12. The purpose and function of the annular groove 40 shall be described hereinafter. In an embodiment, the bolt 12 is made of steel. In other embodiments, the bolt 12 may be made from other suitable materials known in the art. In another embodiment, the fastener 10 may include a screw or other pin members known in the art, instead of the bolt 12.

Referring to FIGS. 2A through 2D, in an embodiment, the upper grommet 16 includes a tubular-shaped receptacle 46 having a circular-shaped aperture 48, and a head 50 extending from the receptacle 46. In an embodiment, the head 50 is flared. In an embodiment, the head 50 includes an exterior surface 52, an interior surface 54, and an annular pocket (i.e., depression) 56 formed within the interior surface 54 intermediate an upper end 58 and a lower end 60 of the upper grommet 16. The purpose and function of the pocket 56 shall be described hereinafter. In an embodiment, the upper grommet 16 is made from stainless steel. In other embodiments, the upper grommet 16 can be made from titanium or other suitable materials known in the art. In another embodiment, the fastener 10 need not include the upper grommet 16, which will be described hereinbelow.

Referring to FIGS. 3A through 3D, in an embodiment, the lower grommet 18 includes a tubular portion 62 having a circular-shaped aperture 64, a flared portion 66 extending from one end, and a circular-shaped base member 68 extending from an opposite end. The base member 68 includes a top surface 70 and an annular compressive wall 72 extending from the top surface 70 and forming an interior portion 74. In an embodiment, the lower grommet 18 is made from stainless steel. In other embodiments, the lower grommet 18 can be made from titanium or other suitable materials known in the art.

Figure 4A:
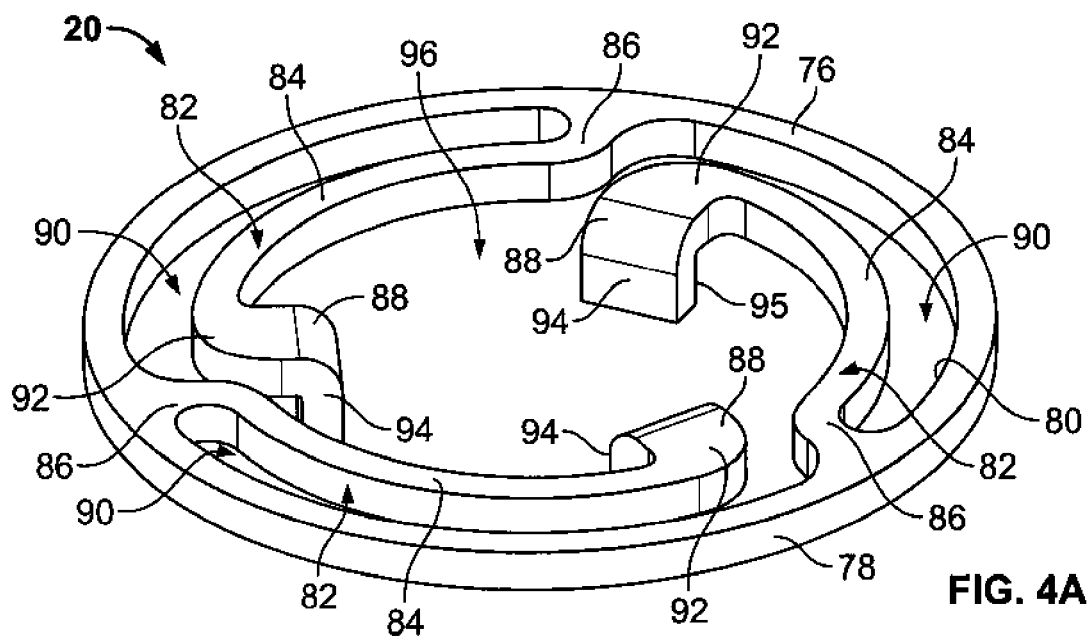
FIGS. 4A and 4B are top and bottom perspective views of a retainer ring employed by the captive panel fastener shown in FIG. 1.
Figure 4B:
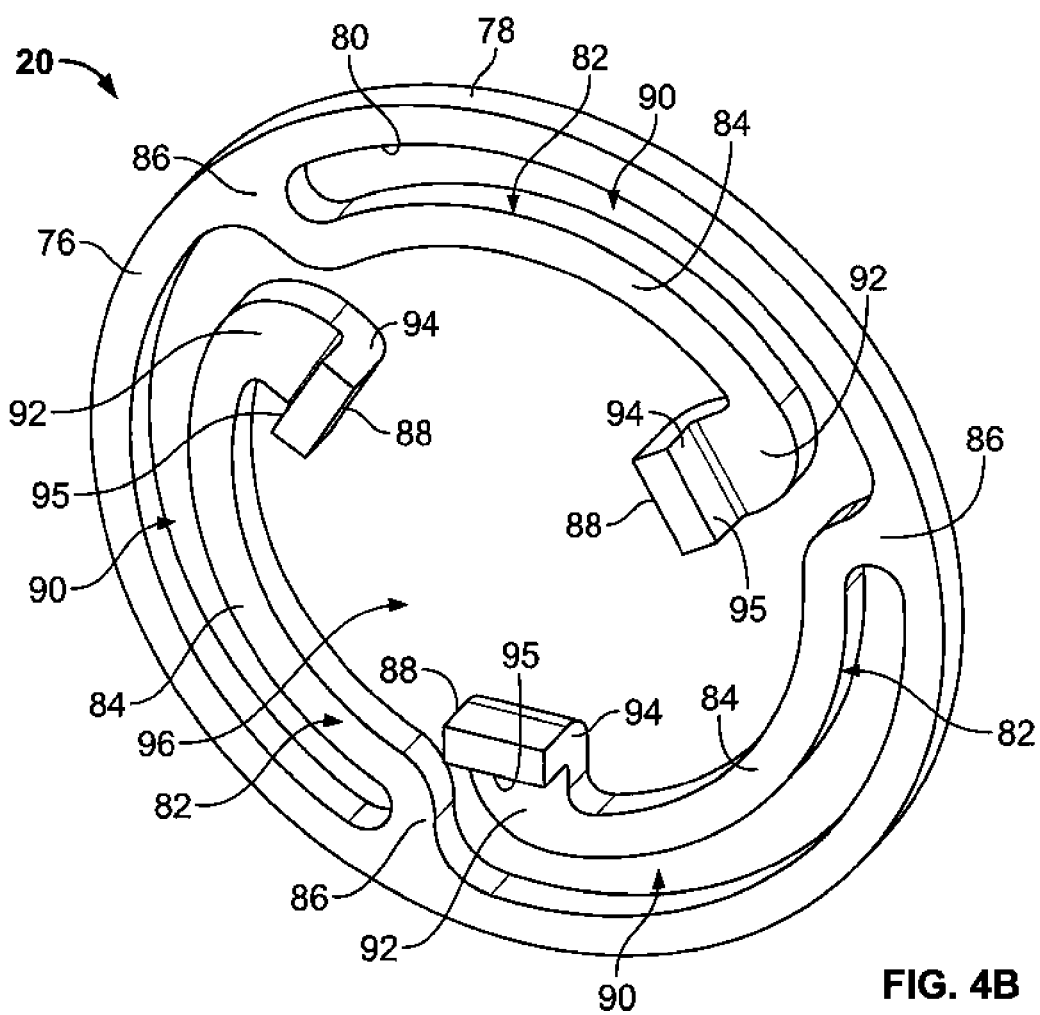

Referring to FIGS. 4A and 4B, in an embodiment, the retainer ring 20 includes an outer ring 76 having an exterior surface 78, an interior surface 80, and a plurality of spring beam elements 82 extending inwardly from the interior surface 80. In an embodiment, each of the spring beam elements 82 includes an elongated arm 84 having a first end 86 attached integrally to the interior surface 80 of the outer ring 76, and a second, free end 88 opposite the first end 86. In an embodiment, a slot 90 is formed between each of the arms 84 and the interior surface 80 of the outer ring 76. The slots 90 allow for deflection of the spring beam elements 82. In an embodiment, each of the arms 84 is curvilinear in shape and is positioned concentrically with the outer ring 76. In an embodiment, the outer ring 76 is continuous. In another embodiment, the outer ring 76 need not be continuous, and rather than the spring beam elements 82 being curvilinear in shape, they can be configured to extend from one point on the outer ring 76 in a direction toward another point on the outer ring 76 while not passing through the center of the retainer ring 20 (not shown in the Figures).

Still referring to FIGS. 4A and 4B, in an embodiment, each of free ends 88 of the arms 84 includes a tab portion 92. In an embodiment, each of the tab portions 92 extends substantially perpendicular to and in the same plane as the corresponding free end 88 of the arm 84. In an embodiment, a pressure pad 94 extends from each of a corresponding one of the tab portions 92. In an embodiment, each of the pressure pads 94 includes an outer surface 95 (see FIG. 4A). In an embodiment, each of the pressure pads 94 extends perpendicular to the corresponding arm 84 in a second direction, i.e., 90 degrees from the plane in which the retainer ring 20 lies. In an embodiment, each of the tab portions 92 is generally wider than the corresponding spring beam element 32 and is sized to resist shear load action on the spring beam element 82. In an embodiment, each of the pressure pads 94 is thicker than the nominal thickness of the retainer ring 20. In an embodiment, a centrally-located aperture 96 is formed between the free ends 88 of the beam elements 82. As to be described below, the aperture 96 is sized and shaped to receive the bolt 12.

Figure 4C:
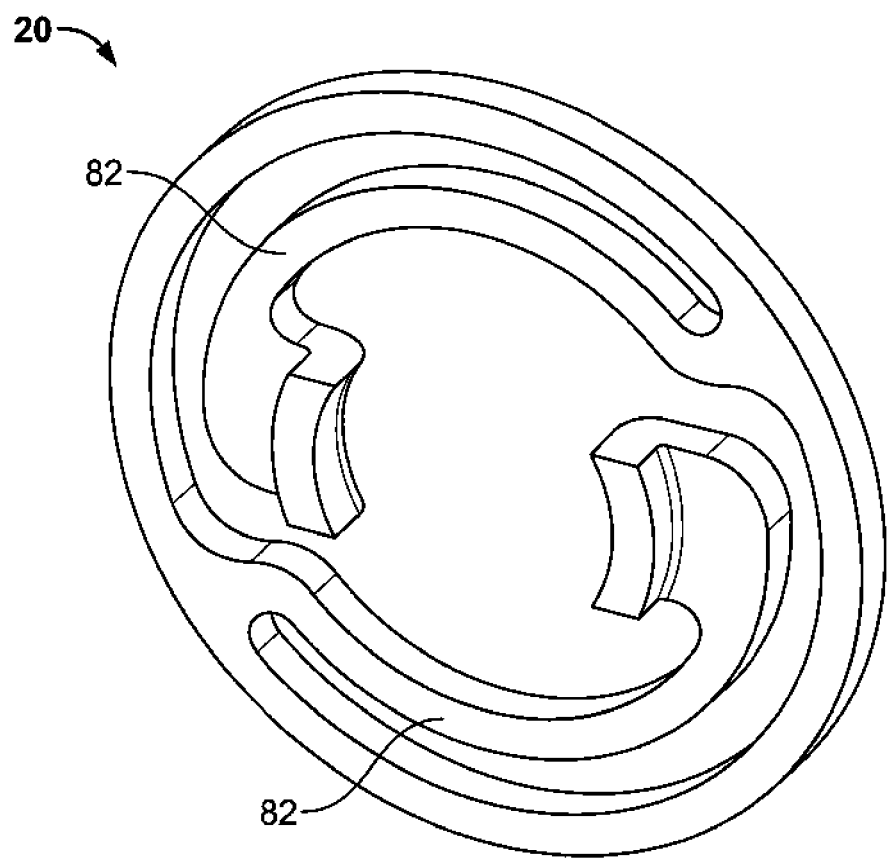
FIG. 4C is a bottom perspective view of another embodiment of a retainer ring.

In an embodiment, as shown in FIGS. 4A and 4B, the retainer ring 20 includes three of the spring beam elements 82. In another embodiment, as shown in FIG. 4C, the retainer ring 20 may include two of the spring beam elements 82. In other embodiments, the retainer ring 20 may include one of the spring beam elements 82 or more than three of the spring beam elements 82 (not shown in the Figures). In an embodiment, the retainer ring 20 is made from a beta-Titanium alloy. In other embodiments, the retainer ring 20 is made from stainless steel or other suitable materials known in the art.

Referring to FIGS. 5A through 5D, in an embodiment, the housing 22 includes a first surface 98 and a second surface 100 opposite the first surface 98, an circular-shaped outer wall 102 extending from the second surface 100, and a circular-shaped inner wall 104 extending from the second surface 100 and spaced apart from and concentric with the outer wall 102. In an embodiment, the outer and inner walls 102, 104 form a circular-shaped channel 106. In an embodiment, a centrally located, circular-shaped aperture 108 extends from the first surface 98 to the second surface 100. In an embodiment, the inner wall 104 includes a plurality of windows 110 extending therethrough, each of which includes a stop surface 112. The purpose and function of the windows 110 and the stop surfaces 112 shall be described hereinafter. In an embodiment, the housing 22 is made from stainless steel. In other embodiments, the housing 22 may be made from other suitable materials known in the art.

Figure 6:
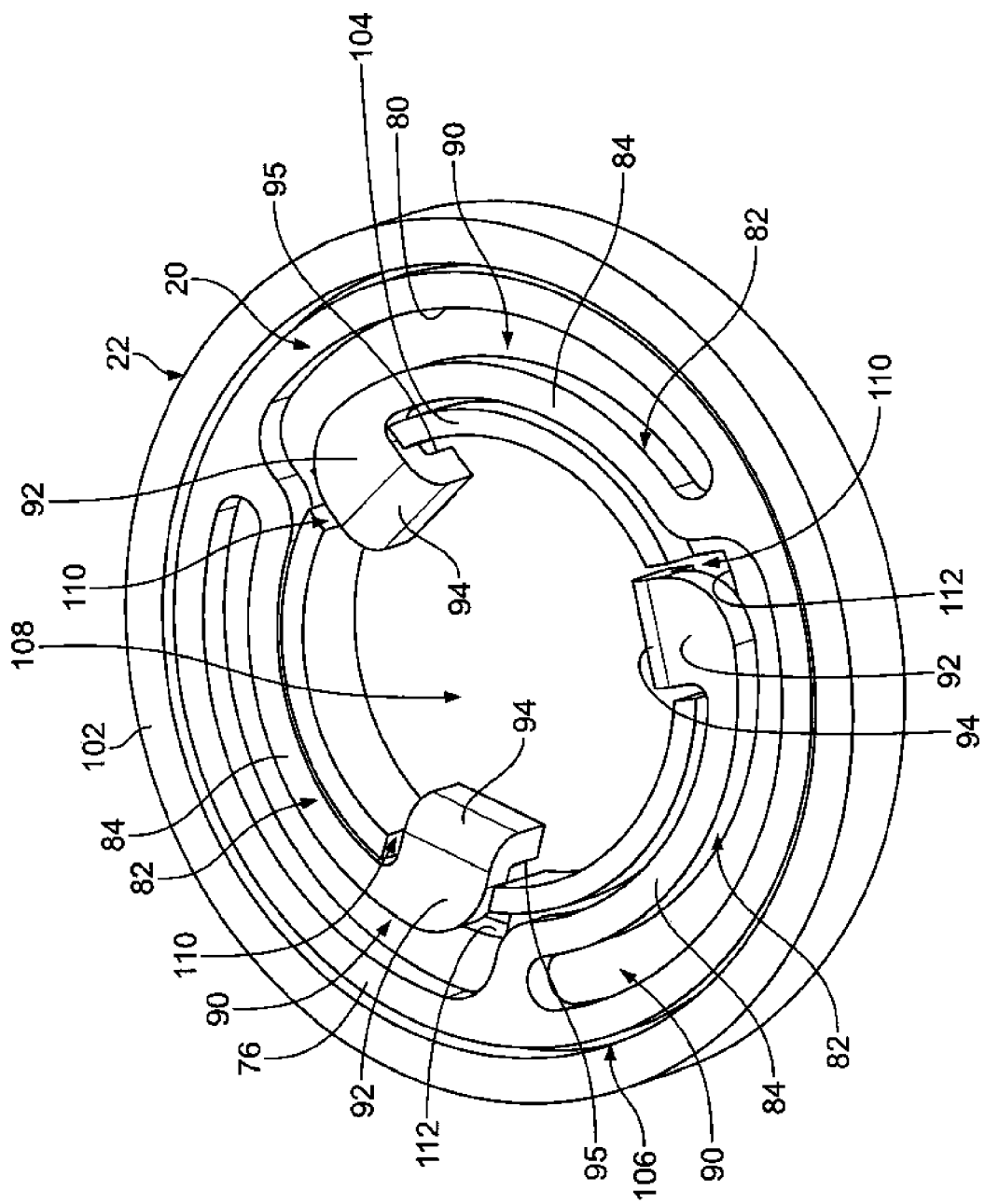
FIG. 6 is a perspective view of the retainer ring shown in FIGS. 4A and 4B housed within the housing shown in FIGS. 5A through 5D.

Referring to FIG. 6, in an embodiment, the housing 22 is sized and shaped to house the retainer ring 20. In an embodiment, an inner diameter of the outer wall 102 of the housing 22 is larger than the outer diameter of the outer ring 76 of the retainer ring 20 in order for the housing 22 to receive the retainer ring 20 within the channel 106. In an embodiment, when the retainer ring 20 is housed within the housing 22, each of the windows 110 of the housing 22 is sized and shaped to receive a corresponding one of the tab portions 92 of the retainer ring 20. In an embodiment, the pressure pads 94 of the retainer ring 20 extend freely within the aperture 108 of the housing 22, while the arms 84 of the spring beam elements 82 of the retainer ring 20 lie within the channel 106 and are juxtaposed with the inner wall 104 of the housing 22. As to be described in more detail below, in an embodiment, each of the spring beam elements 82 are moveable between a free position, in which each of the pressure pads 94 of the retainer ring 20 resides within its corresponding one of the windows 110 of the housing 22, to an expanded position, in which the outer surface 95 of the pressure pad 94 contacts the corresponding stop surface 112. In an embodiment, the slots 90 allow for such movement of the spring beam elements 82. Accordingly, in an embodiment, the travel of the spring beam elements 82 are impeded by the stop sections 112 when the spring beam elements 82 are in their expanded positions. In an embodiment, the windows 110 allow the tab portions 92 to protrude inside the internal diameter of the grommet assembly 14.

Figure 7:
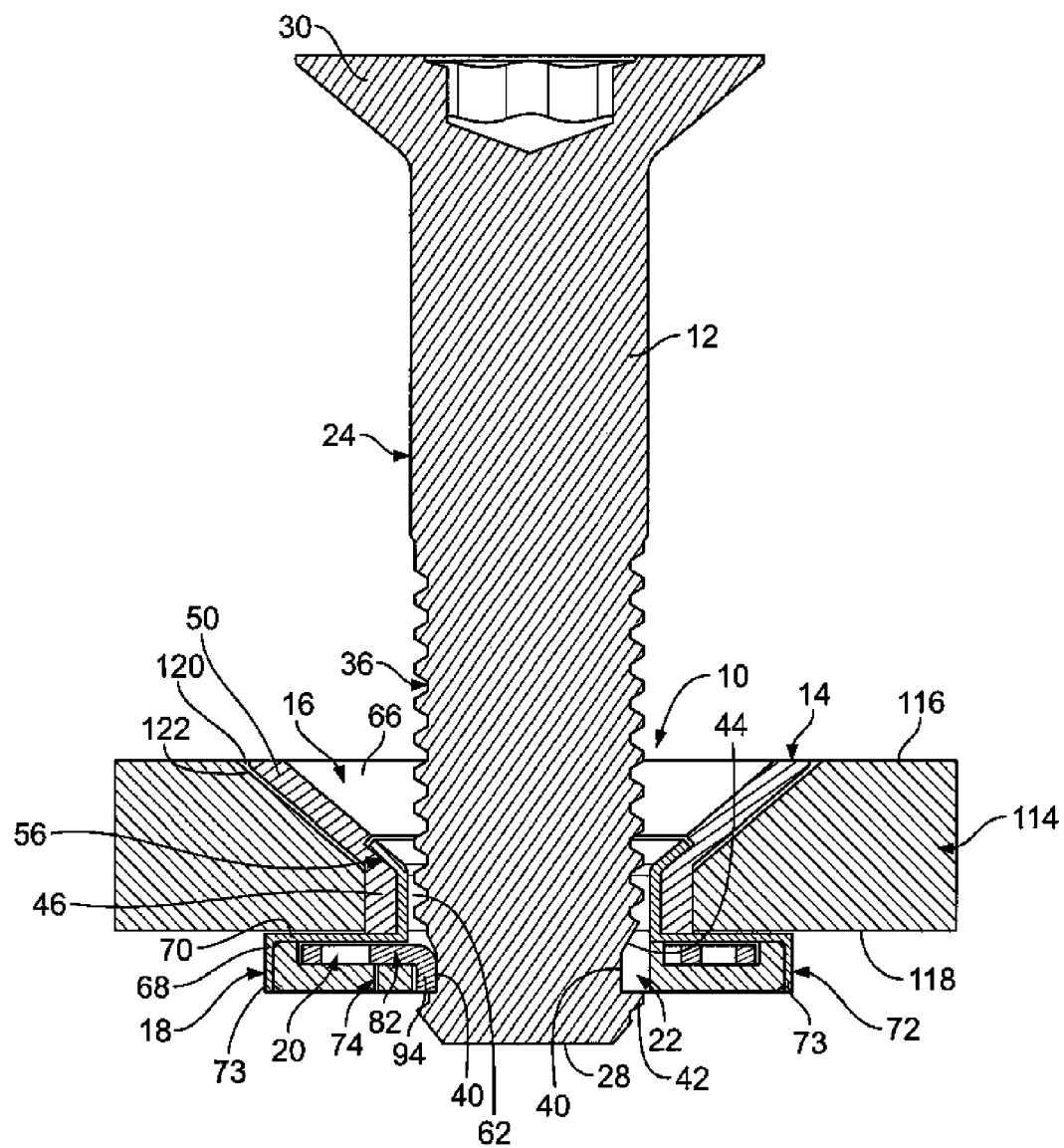
FIG. 7 is a cross-sectional view of the captive panel fastener shown in FIG. 1, as assembled, captivated onto a work piece, with the bolt in a fully retracted, hold-out position.

Referring to FIG. 7, the fastener 10 is installed within a work piece 114 having a first side 116 and a second side 118 opposite the first side 116, and a hole 120 extending from the first side 116 to the second side 118. In an embodiment, the work piece 114 is a panel. In an embodiment, the work piece 114 is a carbon fiber reinforced structure. In an embodiment, the upper grommet 16 is inserted into the hole 120 of the work piece 114. In an embodiment, the hole 120 includes a countersunk area 122 formed at the first side 116 and sized and shaped to receive the head 50 of the upper grommet 16 so that the top of the head 50 is flush with the first side 116 of the work piece 114. In an embodiment, the upper grommet 16 lines the countersunk area 122 of the hole 120 in order to protect the work piece 114 from wear and usage. In an embodiment, the fastener 10 need not include the upper grommet 16.

Figure 8A:
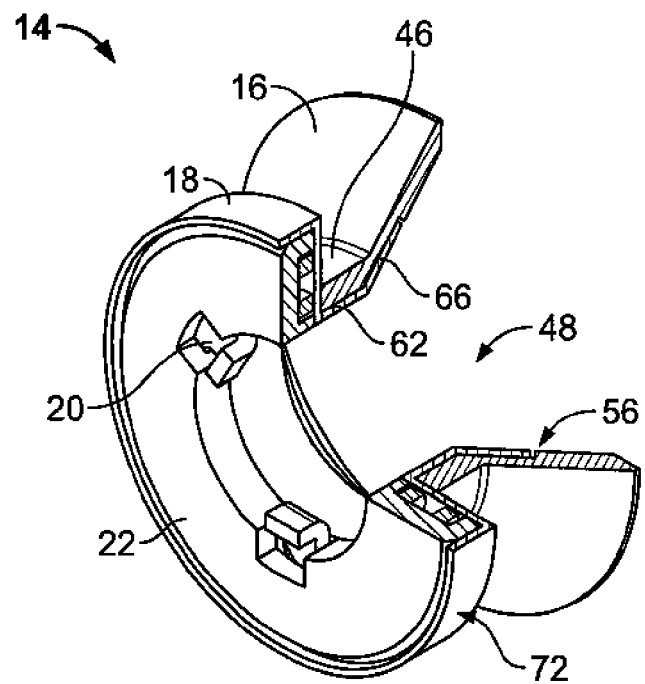
FIGS. 8A and 8B are quarter-sectional views of a grommet assembly employed by the captive panel fastener shown in FIG. 7, as assembled, but without the bolt.
Figure 8B:
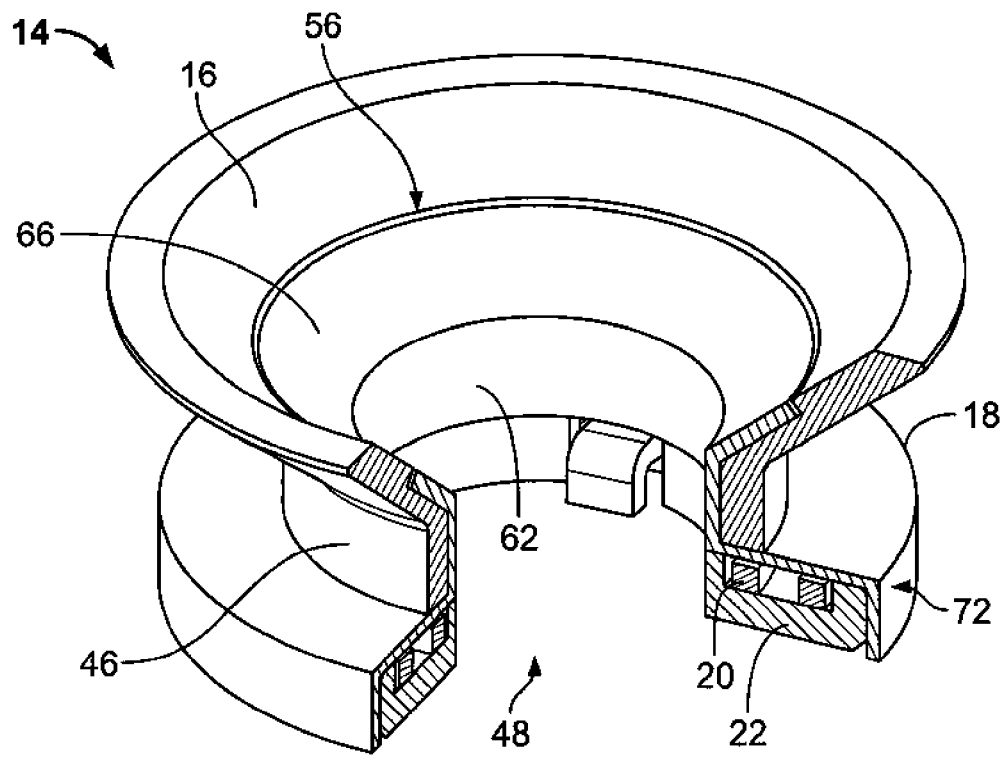
Figure 9A:
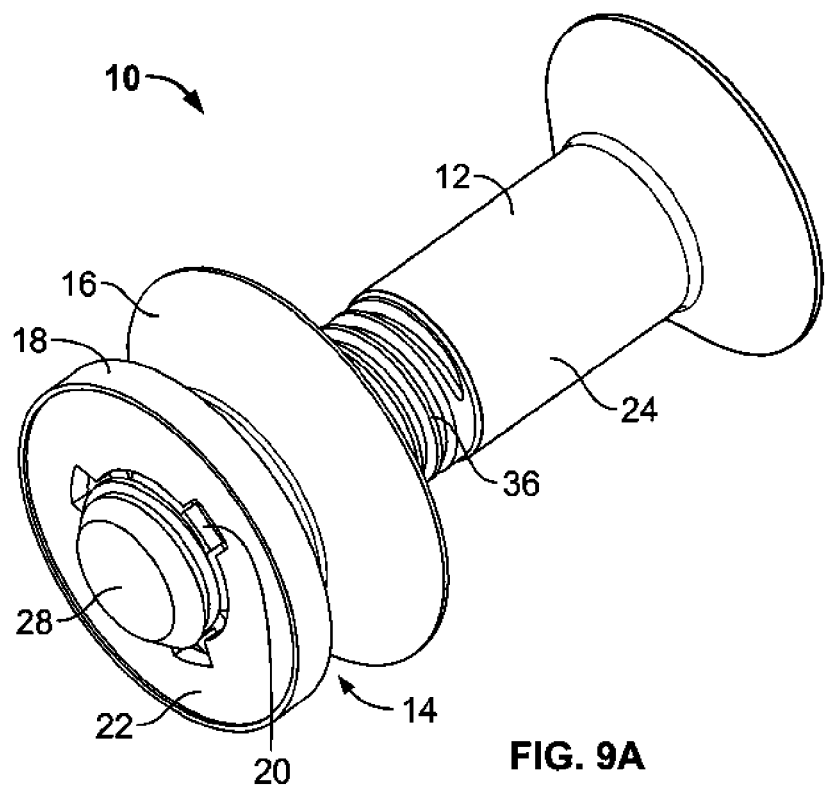
FIGS. 9A through 9C are perspective views of the captive panel fastener shown in FIG. 1, as assembled.
Figure 9B:
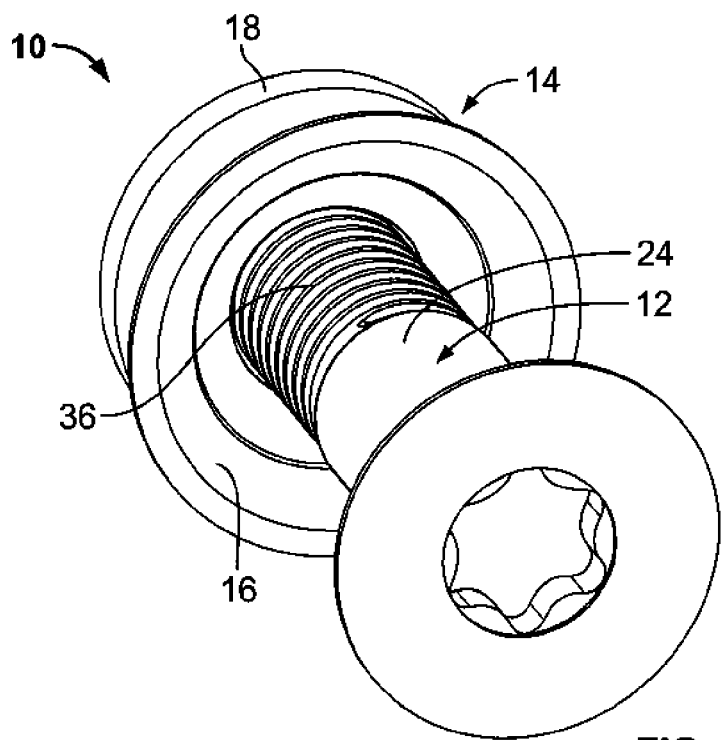
Figure 9C:
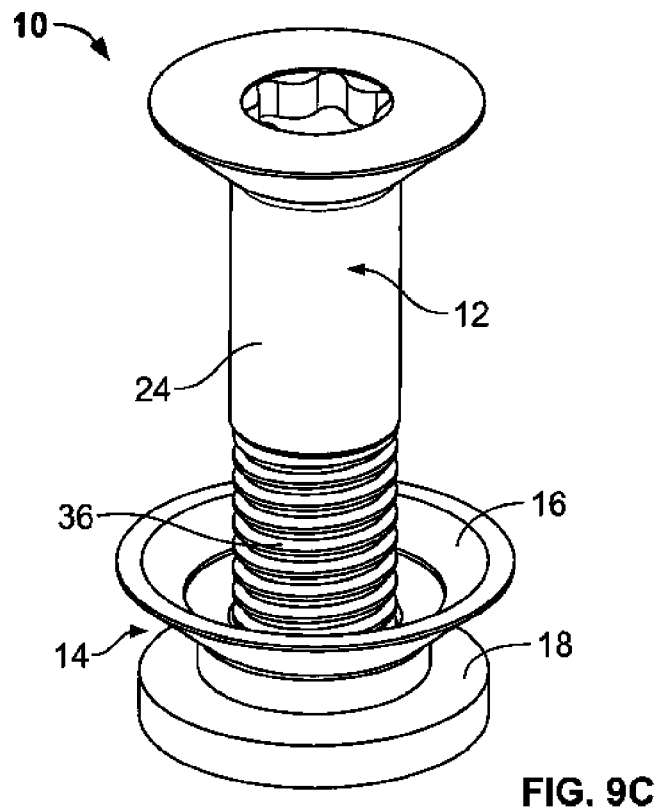
Figure 10A:
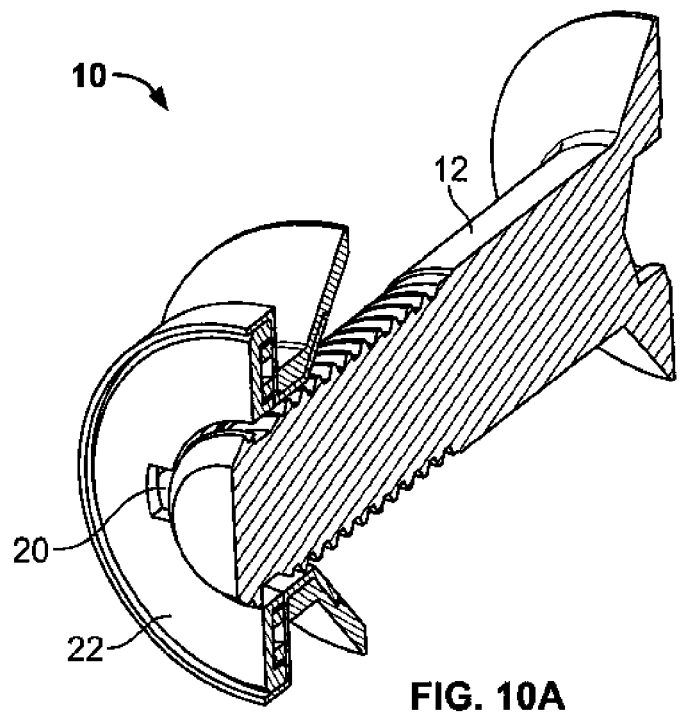
FIGS. 10A through 10C are cross-sectional views of the assembled captive panel fastener shown in FIGS. 9A through 9C.
Figure 10B:
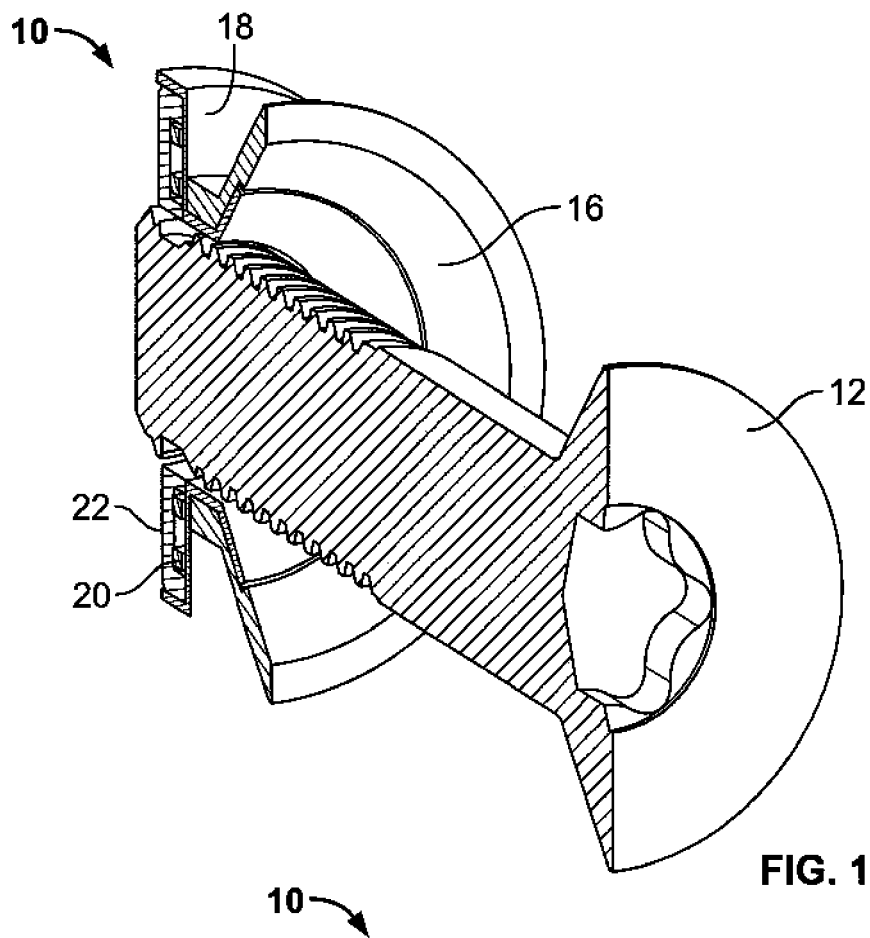
Figure 10C:
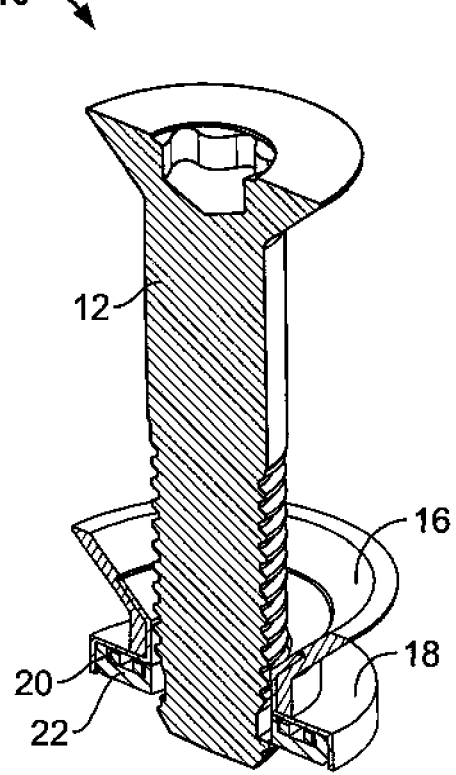

Referring to FIGS. 7, 8A and 8B, in an embodiment, the tubular portion 62 of the lower grommet 18, which is originally configured without the flared portion 66 (not shown in the Figures), is inserted into the aperture 48 of the receptacle 46 of the upper grommet 16 from the second side 118 of the work piece 114. In an embodiment, the receptacle 46 of the upper grommet 16 is sized and shaped to receive the tubular portion 62 of the lower grommet 18. In an embodiment, the flared portion 66 is then formed by mechanically flaring or swaging the top of the tubular portion 62 of the lower grommet 18, such that the flared portion 66 sits within the annular pocket 56 of the upper grommet 16. In an embodiment, the top surface 70 of the base member 68 of the lower grommet 18 is juxtaposed with the second side 118 of the work piece 114 (see FIG. 7).

Next, in an embodiment, the retainer ring 20 is assembled with the housing 22 as described above and shown in FIG. 6, and the assembly is inserted within the interior portion 74 of the lower grommet 18, as shown in FIG. 7. In an embodiment, the inner diameter of the interior portion 74 of the base member 68 of the lower grommet 18 is larger than the outer diameter of the housing 22 and is sized and shaped to receive the housing 22. In an embodiment, a lower end 73 of the annular compressive wall 72 is then compressed about its periphery to encapsulate the retainer ring 20 and the housing 22 within the interior portion 74 of the lower grommet 18 and to prevent the retainer ring 20 and the housing 22 from escaping (see FIG. 7). This completes the assembly of the grommet assembly 14.

Next, referring to FIGS. 7 and 9A through 9C, in an embodiment, the second end 28 of the bolt 12 is inserted into the grommet assembly 14 from the first side 116 of the work piece 114, such that the threaded portion 36 of the shank 24 enters the apertures 48, 64 of the upper and lower grommets 16, 18, respectively (the apertures 48, 64 being shown in FIGS. 2A and 3A, respectively), until the second end 28 of the bolt 12 reaches and engages the retainer ring 20. In an embodiment, as the bolt 12 engages the retainer ring 20, the spring beam elements 82 are displaced and expand radially from their free state position to their expanded position in order to enable the bolt 12 to travel within the aperture 96 of the retainer ring 20 (which is shown in FIGS. 4A and 4B). As mentioned above, in an embodiment, the spring beam elements 82 can radially expand until the pressure pads 94 engage the stop surfaces 112 of the housing 22, so as to prevent the spring beam elements 82 from traveling too far and permanently deforming (see FIG. 6). Thus, in an embodiment, the position of the pressure pads 94 on the tab portions 92 is configured to limit the travel of the spring beam elements 82 as they come in contact with the stop surfaces 112 of the windows 110. In an embodiment, this provides a limit to the stress on the spring beam elements 82 when the retainer ring 20 is housed in the grommet assembly 14. In an embodiment, the interior surface 80 of the outer ring 76 of the retainer ring 20 acts as a second limit to the deflection of the spring beam elements 82 (see FIG. 6).

Figure 11A:
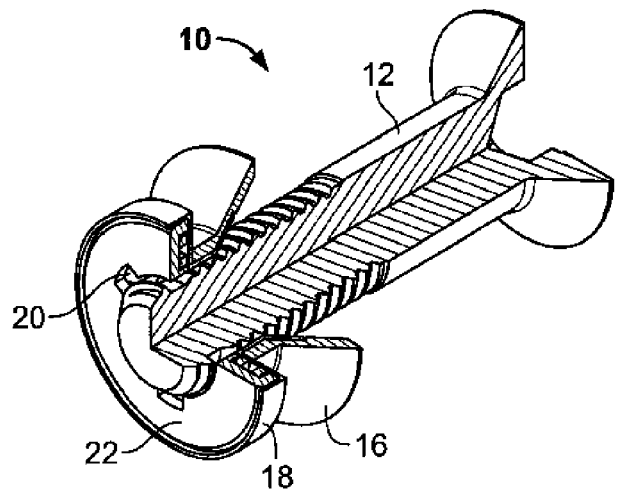
FIGS. 11A through 11C are quarter-sectional views of the assembled captive panel fastener shown in FIGS. 9A through 9C.
Figure 11B:
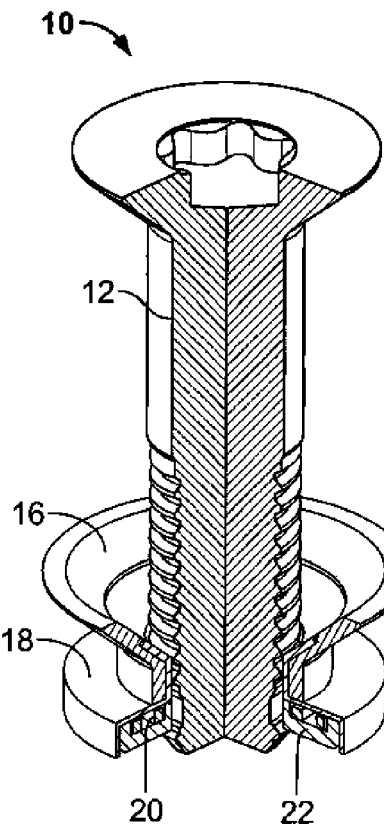
Figure 11C:
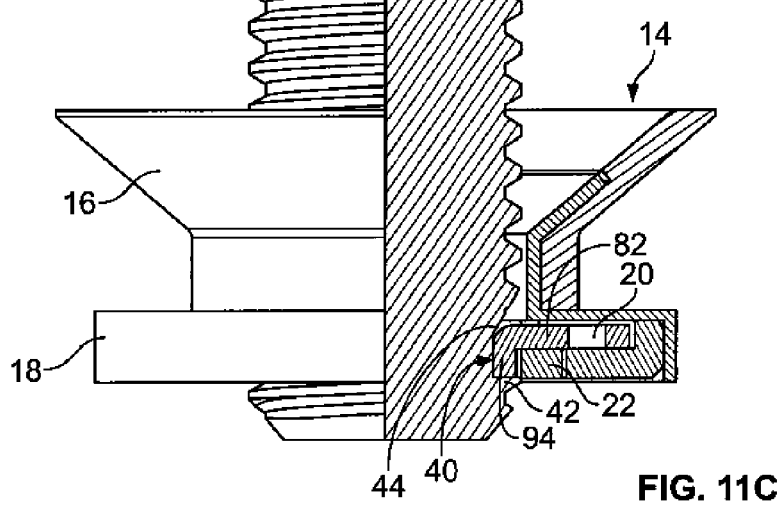
Figure 12A:
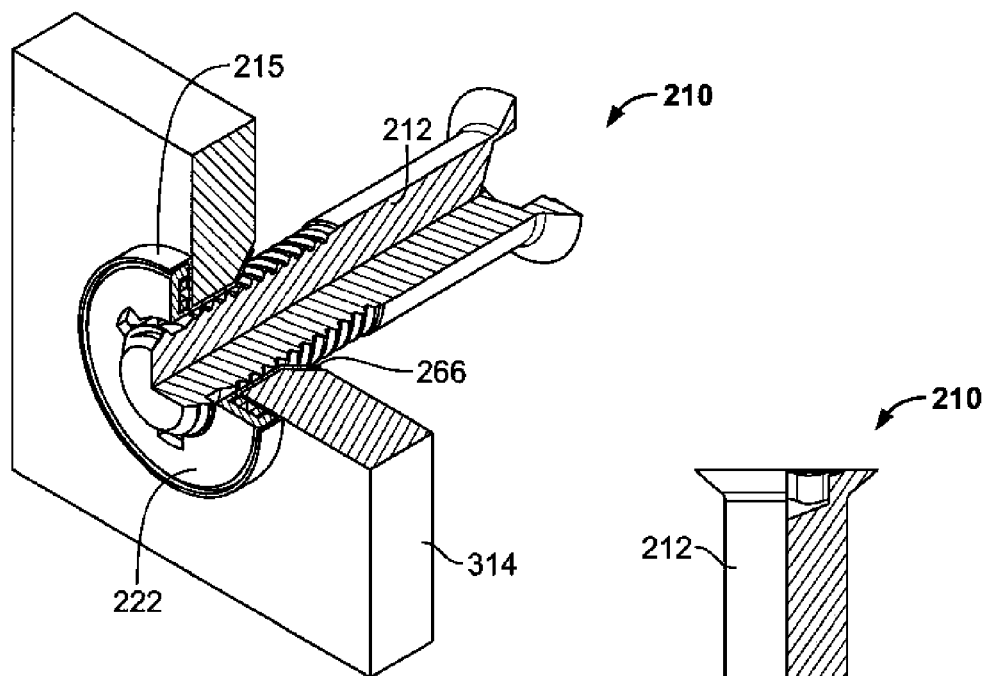
FIGS. 12A through 12C are cross-sectional views of a captive panel fastener in accordance with another embodiment.
Figure 12B:
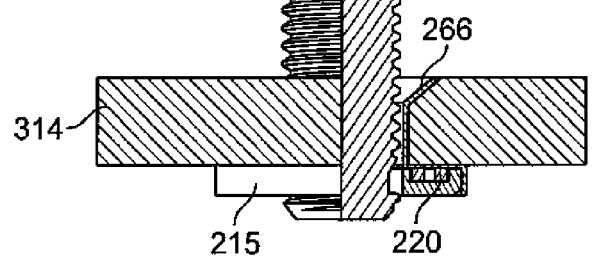
Figure 12C:
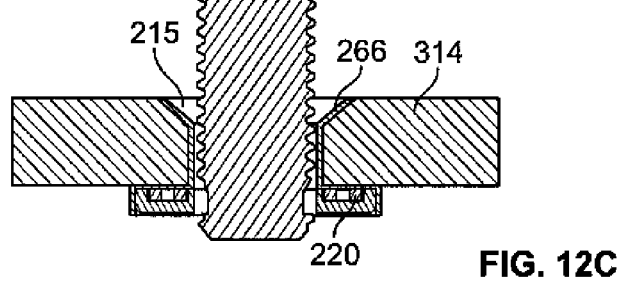
Figure 13A:
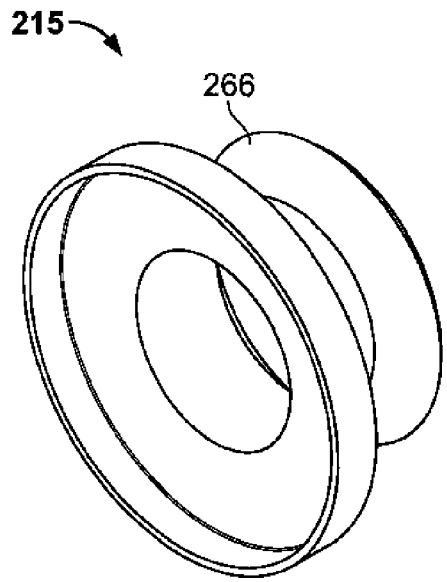
FIGS. 13A through 13D are bottom and top perspective views of a grommet employed by the captive panel fastener shown in FIGS. 12A through 12C.
Figure 13B:
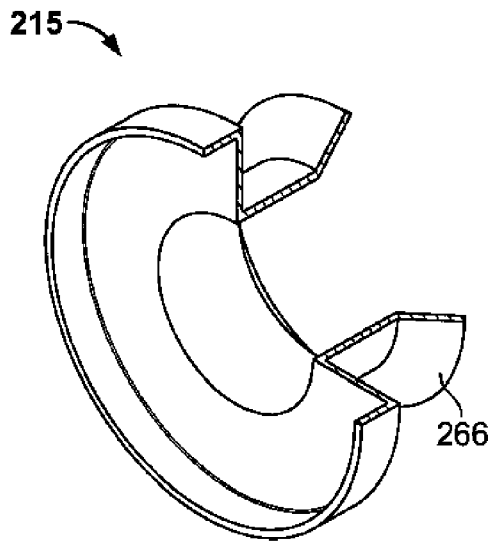
Figure 13C:
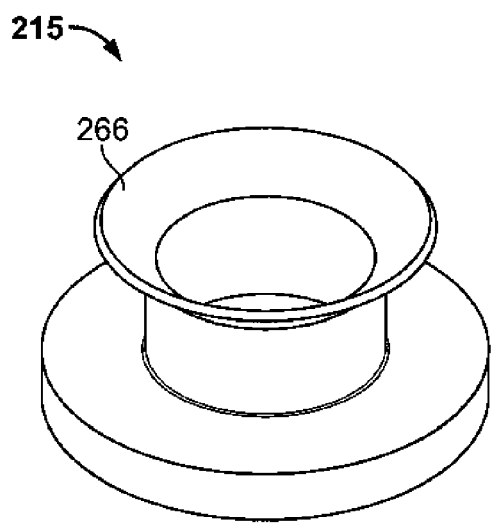
Figure 13D:
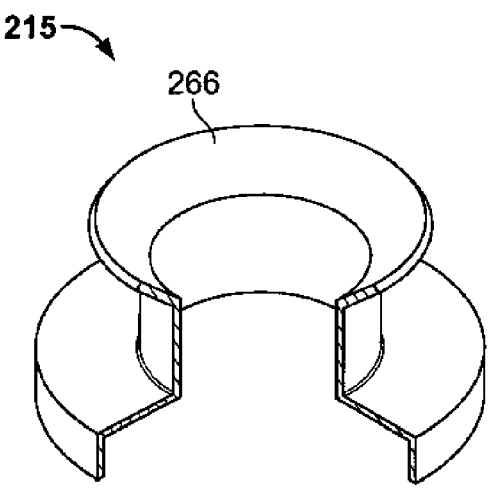
Figure 14A:
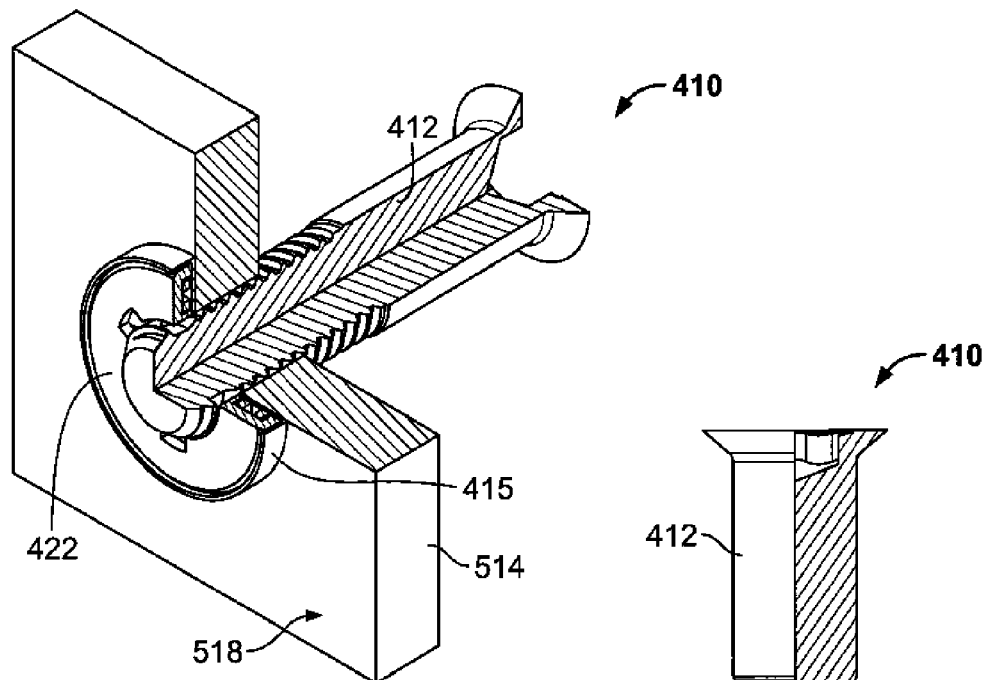
FIGS. 14A through 14C are cross-sectional views of a captive panel fastener in accordance with another embodiment.
Figure 14B:
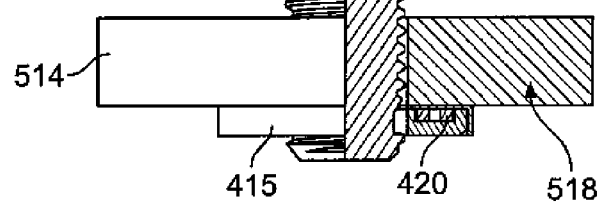
Figure 14C:
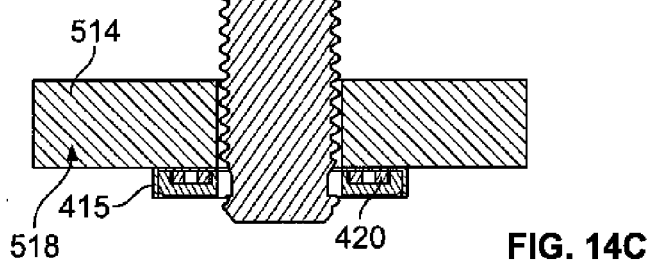
Figure 15A:
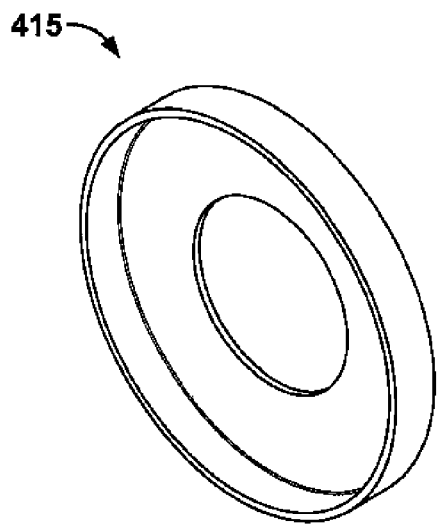
FIGS. 15A through 15D are bottom and top perspective views of a grommet employed by the captive panel fastener shown in FIGS. 14A through 14C.
Figure 15B:
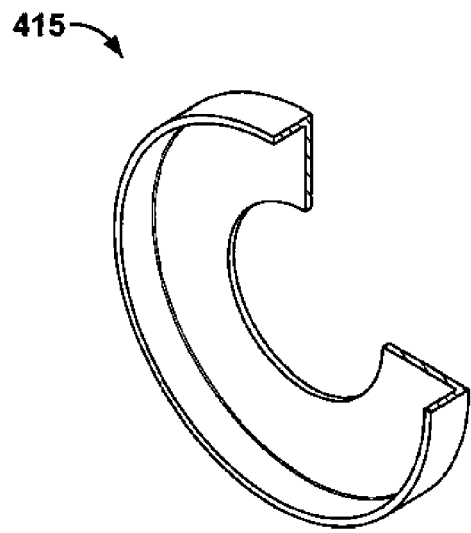
Figure 15C:
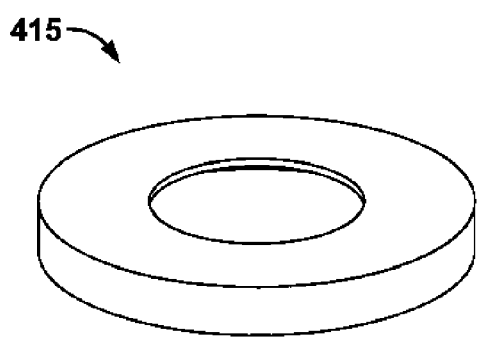
Figure 15D:
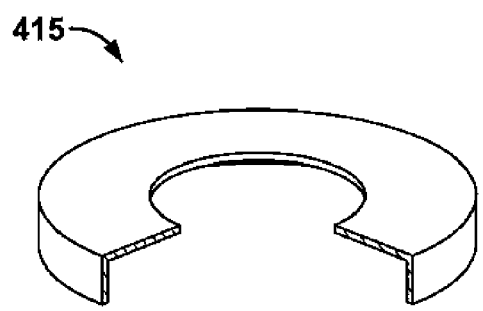

In an embodiment, as shown in FIGS. 7 and 11C, as the bolt 12 is pushed into the retainer ring 20 and the pressure pads 94 engage and align with the annular groove 40 of the bolt 12, the spring beam elements 82 spring back from their expanded positions to their free state positions. In this manner, in an embodiment, the pressure pads 94 engage and reside within the annular groove 40, resulting in the bolt 12 being captivated to the grommet assembly 14. As shown in FIG. 7, the bolt 12 is in a full hold-out position. In an embodiment, the ramped portion 44 of the bolt 12 enables it to be inserted further into the work piece 114 through the grommet assembly 14 so as to expose the threaded portion 36 of the bolt 12 from the second side 118 of the work piece 114 to receive a locking member, such as a nut, collar or the like (not shown in the Figures). In an embodiment, the bolt 12 can also be retracted back to the hold-out position. In one or more embodiments, the retainer ring 20 is sized and shaped to slide over the threaded portion 36 of the bolt 12 with little resistance. In an embodiment, the first annular portion 42 inhibits the bolt 12 from being decaptivated from the grommet assembly 14. FIGS. 10A through 11C further show various cross-sectional views of the assembled fastener 10.

In an embodiment, the pressure pads 94 distribute the bearing loads and enable the retainer ring 20 to straddle two adjacent threads 38 of the bolt 12 and slide over the threads 38 without impedance. In one or more embodiments, the thickness of the pressure pads 94 can be symmetric to the thickness of the retainer ring 20 or it can asymmetric with the thickness of the retainer ring 20.

In an embodiment, as mentioned above, the fastener 10 provides for hold out of the bolt 12 while captivating the bolt 12 to the grommet assembly 14 and the work piece 114 upon which it is installed. In its free state, the retainer ring 20 resides in the annular groove 40 at the second end 28 of the bolt 12 to captivate the bolt 12 to the grommet assembly 14. In an embodiment, the intersection of the threads 38 and the annular groove 40 provides a bearing surface for the retainer ring 20 to limit the axial travel of the bolt 12 and to inhibit the bolt 12 from being removed from the grommet assembly 14. In an embodiment, the bolt 12 resides in the "full retracted position," in which the bolt 12 is in a position where the head 30 of the bolt 12 is at a maximum distance from the grommet assembly 14 while still being captivated unto the work piece 114 by the grommet assembly 14. In an embodiment, this feature which provides resistance to remove the bolt 12 from the work piece 114 is measured by pushing on the bolt 12 to remove it from the work piece 114. In an embodiment, the bolt 12 is free to be moved axially from the position where the head 30 of the bolt 12 is at maximum distance from the work piece to where the head 30 of the bolt 12 is in contact with the grommet assembly 14 with an amount of force. In an embodiment, this force is 10 lbs. However, in an embodiment, the grommet assembly 14 will hold the bolt 12 stationary in any axial position until an external force is applied by a user. The ability of the grommet assembly 14 to hold the bolt 12 stationary is commonly referred to as "bolt hold out". In an embodiment, the bolt 12 is a solid piece with no hollow portions in the shank portion 24; and, therefore, the full strength of the bolt 12 is utilized.

In an embodiment, the retainer ring 20 has a radial displacement which is capable of contracting in its free state to a diameter equivalent to a minor diameter of the threaded portion 36 of the bolt 12. In the expanded condition, an embodiment of the retainer ring 20 is capable of passing over a major diameter of the threaded portion 36. In an embodiment, the retainer ring 20 is capable of displacement from the free-state to the expanded state without exceeding the elastic limit of the retainer ring 20. In an embodiment, the retainer ring 20 holds or fixes the bolt 12 which it accommodates. That is, the retainer ring 20 will hold the bolt 12 in a position concentric to the central axis of the retainer ring 20 while restricting the axial movement of the bolt, 12 through the retainer ring 20. In an embodiment, movement of the bolt 12 through the retainer ring 20 requires the application of an external force to overcome the restriction of the ring 20. In an embodiment, the restriction of the retainer ring 20 can be adjusted by sizing the spring beam elements 82.

Figure 5B:
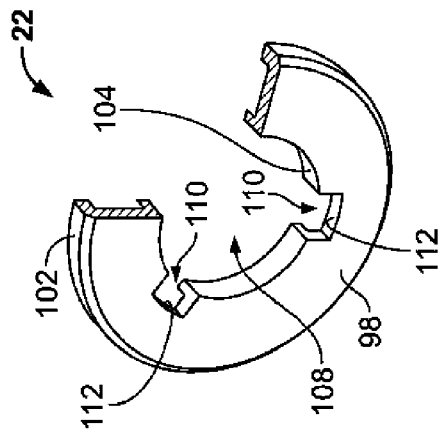
FIGS. 5A through 5D are bottom and top perspective views of a housing employed by the captive panel fastener shown in FIG. 1.
Figure 5D:
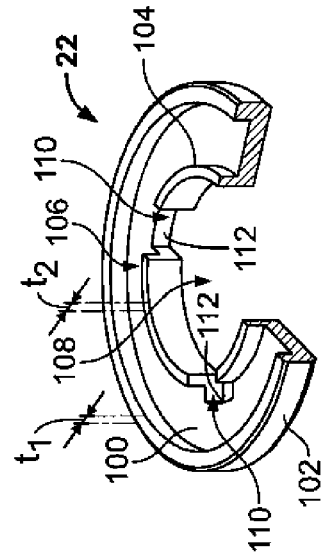
Figure 5A:
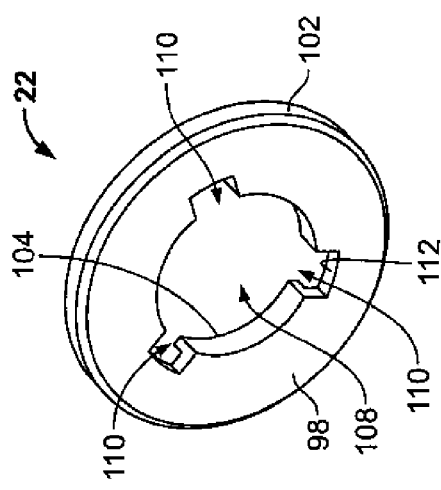
Figure 5C:
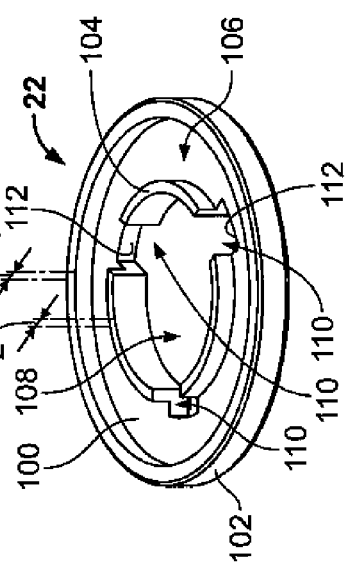

In an embodiment, as shown in FIGS. 5C and 5D, the outer wall 102 of the housing 22 has a first thickness t1, while the inner wall 104 of the housing 22 has a second thickness t2, which are selected to support high compressive loading, especially prevalent when the work piece 114 (e.g., a panel) is thin. In an embodiment, as used herein, the term "high compressive loading" means a load falling within a range from about 800 lbf to about 6,500 lbf for fastener sizes ranging from 3/16" (0.1875 inch) to 3/8" (0.375 inch). In an embodiment, as used herein, the term "thin" in relation to fastener size means when the thickness of the work piece 114 (e.g., a panel) is inferior to the nominal diameter of the fastener 10. For example, when the work piece 114 is thin and a high compressive load is applied, the work piece 114 deflects toward the locking member (e.g., a nut) (not shown in the Figures). When this occurs, it squeezes the housing 22 until it comes in contact with the retainer ring 22. As a result, the arms 84 of the retainer ring 22 are remain free and do not become disabled.

In an embodiment, the thickness t1 of the outer wall 102 of the housing 22 is in the range of about 0.015 inch (15 mil) to about 0.085 inch (85 mil). In another embodiment, the thickness t1 is in the range of about 0.0215 inch (21.5 mil) to about 0.025 inch (25 mil). In another embodiment, the thickness t1 is in the range of about 0.021 inch (21 mil) to about 0.030 inch (30 mil). In another embodiment, the thickness t1 is in the range of about 0.0205 inch (20.5 mil) to about 0.035 inch (35 mil). In another embodiment, the thickness t1 is in the range of about 0.020 inch (20 mil) to about 0.040 inch (40 mil). In another embodiment, the thickness t1 is in the range of about 0.0195 inch (19.5 mil) to about 0.045 inch (45 mil). In another embodiment, the thickness t1 is in the range of about 0.0190 inch (19 mil) to about 0.050 inch (50 mil). In another embodiment, the thickness t1 is in the range of about 0.0185 inch (18.5 mil) to about 0.055 inch (55 mil). In another embodiment, the thickness t1 is in the range of about 0.018 inch (18 mil) to about 0.060 inch (60 mil). In another embodiment, the thickness t1 is in the range of about 0.0175 inch (17.5 mil) to about 0.065 inch (65 mil). In another embodiment, the thickness t1 is in the range of about 0.0170 inch (17 mil) to about 0.070 inch (70 mil). In another embodiment, the thickness t1 is in the range of about 0.0165 inch (16.5 mil) to about 0.075 inch (75 mil). In another embodiment, the thickness t1 is in the range of about 0.016 inch (16 mil) to about 0.080 inch (80 mil).

In an embodiment, the thickness t2 of the inner wall 104 of the housing 22 is in the range of about 0.015 inch (15 mil) to about 0.085 inch (85 mil). In another embodiment, the thickness t2 is in the range of about 0.070 inch (70 mil) to about 0.080 inch (80 mil). In another embodiment, the thickness t2 is in the range of about 0.065 inch (65 mil) to about 0.075 inch (75 mil). In another embodiment, the thickness t2 is in the range of about 0.060 inch (60 mil) to about 0.072 inch (72 mil). In another embodiment, the thickness t2 is in the range of about 0.055 inch (55 mil) to about 0.069 inch (69 mil). In another embodiment, the thickness t2 is in the range of about 0.050 inch (50 mil) to about 0.066 inch (66 mil). In another embodiment, the thickness t2 is in the range of about 0.045 inch (45 mil) to about 0.063 inch (63 mil). In another embodiment, the thickness t2 is in the range of about 0.040 inch (40 mil) to about 0.060 inch (60 mil). In another embodiment, the thickness t2 is in the range of about 0.035 inch (35 mil) to about 0.057 inch (57 mil). In another embodiment, the thickness t2 is in the range of about 0.030 inch (30 mil) to about 0.054 inch (54 mil). In another embodiment, the thickness t2 is in the range of about 0.025 inch (25 mil) to about 0.051 inch (51 mil). In another embodiment, the thickness t2 is in the range of about 0.020 inch (20 mil) to about 0.048 inch (48 mil). In another embodiment, the thickness t2 is in the range of about 0.0195 inch (19.5 mil) to about 0.045 inch (45 mil). In another embodiment, the thickness t2 is in the range of about 0.019 inch (19 mil) to about 0.042 inch (42 mil). In another embodiment, the thickness t2 is in the range of about 0.0185 inch (18.5 mil) to about 0.039 inch (39 mil). In another embodiment, the thickness t2 is in the range of about 0.018 inch (18 mil) to about 0.036 inch (36 mil). In another embodiment, the thickness t2 is in the range of about 0.0175 inch (17.5 mil) to about 0.033 inch (33 mil). In another embodiment, the thickness t2 is in the range of about 0.0170 inch (17.0 mil) to about 0.030 inch (30 mil). In another embodiment, the thickness t2 is in the range of about 0.0165 inch (16.5 mil) to about 0.027 inch (27 mil). In another embodiment, the thickness t2 is in the range of about 0.016 inch (16 mil) to about 0.024 inch (24 mil). In another embodiment, the thickness t2 is in the range of about 0.0155 inch (15.5 mil) to about 0.021 inch (21 mil).

It will be understood that the fastener 10 described herein is merely exemplary and that a person skilled in the art may make many variations and modifications without departing from the full spirit and the scope of the embodiments described herein. For example, in an embodiment, the fastener 10 need not include the upper grommet 16, and the lower grommet 18 can be attached to work piece 114 directly. In this regard, referring to FIGS. 12A through 12C and 13A through 13D, in an embodiment, a captive panel fastener 210 includes a bolt 212, a one-piece grommet 215, a retainer ring 220, and a housing 222. The fastener 210 is structured and functions similar to the fastener 10 described above, except that the grommet 215 is attached directly to the work piece 314 by a flared portion 266 (see FIGS. 3A through 3D). In another embodiment, referring to FIGS. 14A through 14C and 15A through 15D, a captive panel fastener 410 includes a bolt 412, a disc-shaped member 415, a retainer ring 420, and a housing 422. The fastener 410 is structured and functions similar to the fastener 10, except that there is no grommet and the member 415 is attached directly to a second side 518 of a work piece 514. In an embodiment, the member 415 can consist of other shapes and sizes. In other embodiments, the member 415 can be attached to the work piece 514 by bonding, adhesives, welding, mechanical means such as rivets or other fasteners, or other suitable fastening and securing means known in the art.

Figure 16A:
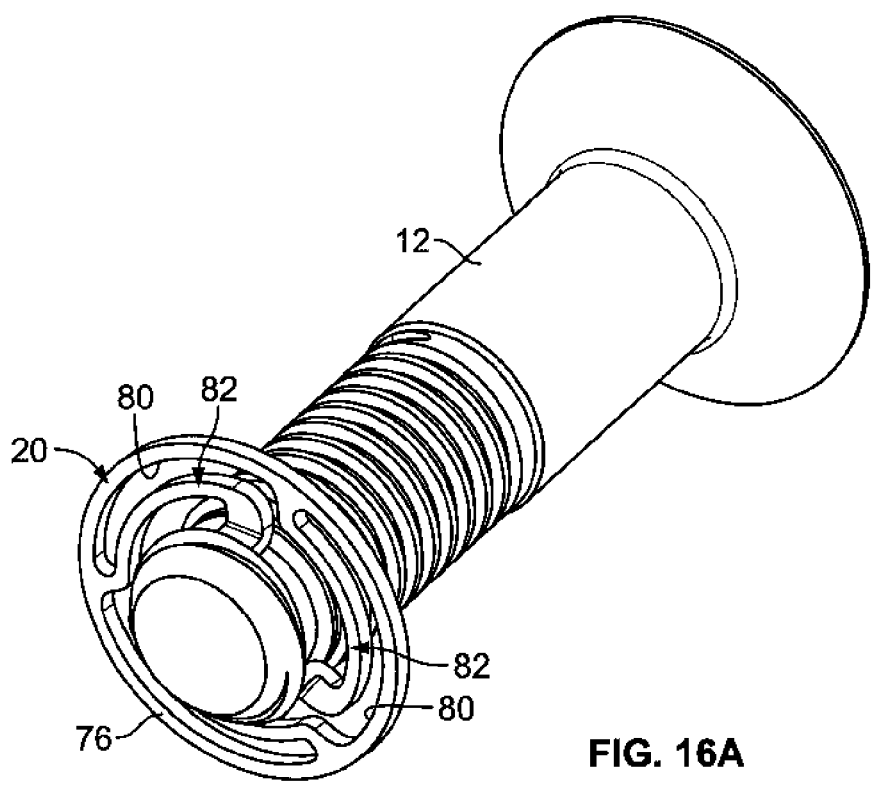
FIGS. 16A and 16B are perspective views of another embodiment of a captive panel fastener.
Figure 16B:
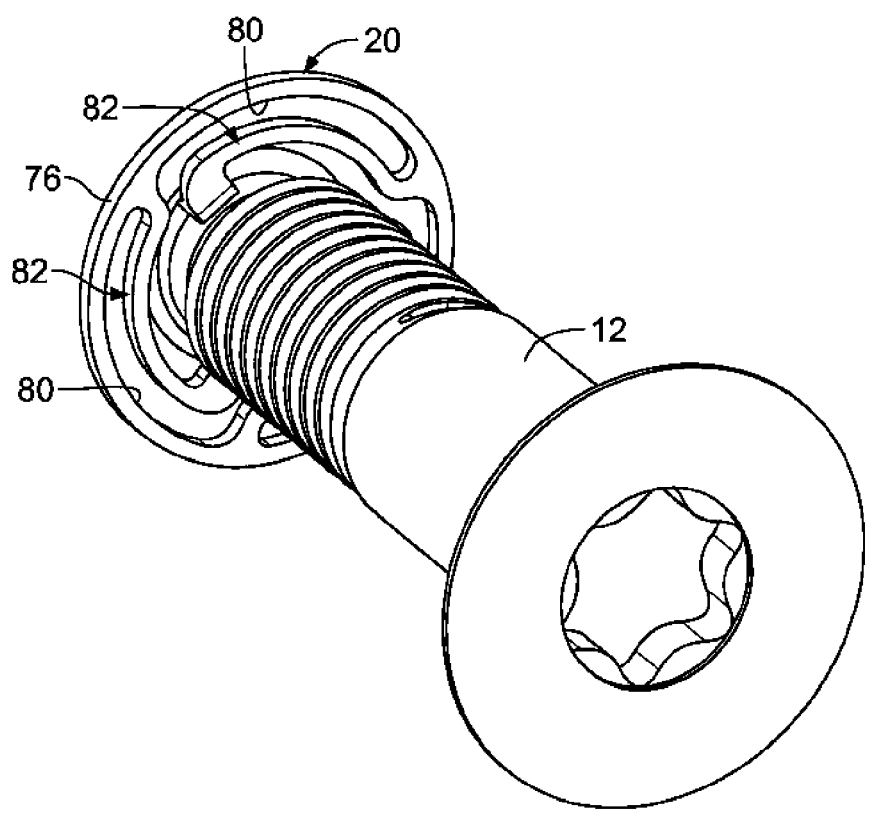

In another embodiment, the fastener 10 need not include the upper and lower grommets 16, 18 and the housing 22. In this regard, in the embodiments shown in FIGS. 16A and 16B, the retainer ring 20 can be attached directly to the bolt 12 in the manner as described above. In this regard, the interior surface 80 of the outer ring 76 of the retainer ring 20 limits the deflection of the beam elements 82.

FIGS. 17A and 17B show an embodiment of a retainer ring 520, a housing 522, and a cover 523 that is attached to the housing 522. Referring to FIG. 17A, in an embodiment, the retainer ring 520 includes three separate and distinct curvilinear-shaped, cantilevered arms 584, each of which includes a first end 586 having a V-shaped engagement member 594, and a second end 588 opposite the first end 586 and having a U-shaped hook member 589. In an embodiment, the housing 522 includes a circular-shaped outer wall 602 and a circular-shaped inner wall 604 spaced apart from and concentric with the outer wall 602. In an embodiment, the outer and inner walls 602, 604 form a circular-shaped channel 606. In an embodiment, the inner wall 604 includes a plurality of windows 610 extending therethrough, while the outer wall 604 includes a plurality of T-shaped slots 611 formed therein. In an embodiment, the housing 522 includes three of the windows 610, which are positioned equidistant from one another, and three of the slots 611 which are positioned equidistant from one another. Referring to FIG. 17B, in an embodiment, each of the arms 584 of the retainer ring 520 are housed within the channel 606 of the housing 522. In this regard, each of the hook members 589 engages a corresponding one of the slots 611 of the housing 522, while each of the engagement members 594 resides within a corresponding one of the windows 610.

In an embodiment, when a bolt (such as the bolt 12 described above) engages the retainer ring 520, the first ends 586 of the arms 584 are displaced and expand radially from a free state position to an expanded position in order to enable the bolt 12 to travel within the ring 520 (not shown in the Figures). During the insertion of the bolt 12, the second ends 588 of the arms 584 are secured in place by the engagement of the hook members 589 of the retainer ring 520 with the slots 611 of the housing 522. As the bolt 12 is pushed into the retainer ring 520 and the engagement members 594 engage and align with the annular groove 40 of the bolt 12, the arms 584 spring back from their expanded positions to their free state positions (not shown the Figures). In this manner, the vertices of the engagement members 594 engage and reside within the annular groove 40 of the bolt 12, resulting in the bolt 12 being captivated (not shown in the Figures).

Figures 18A, 18B:
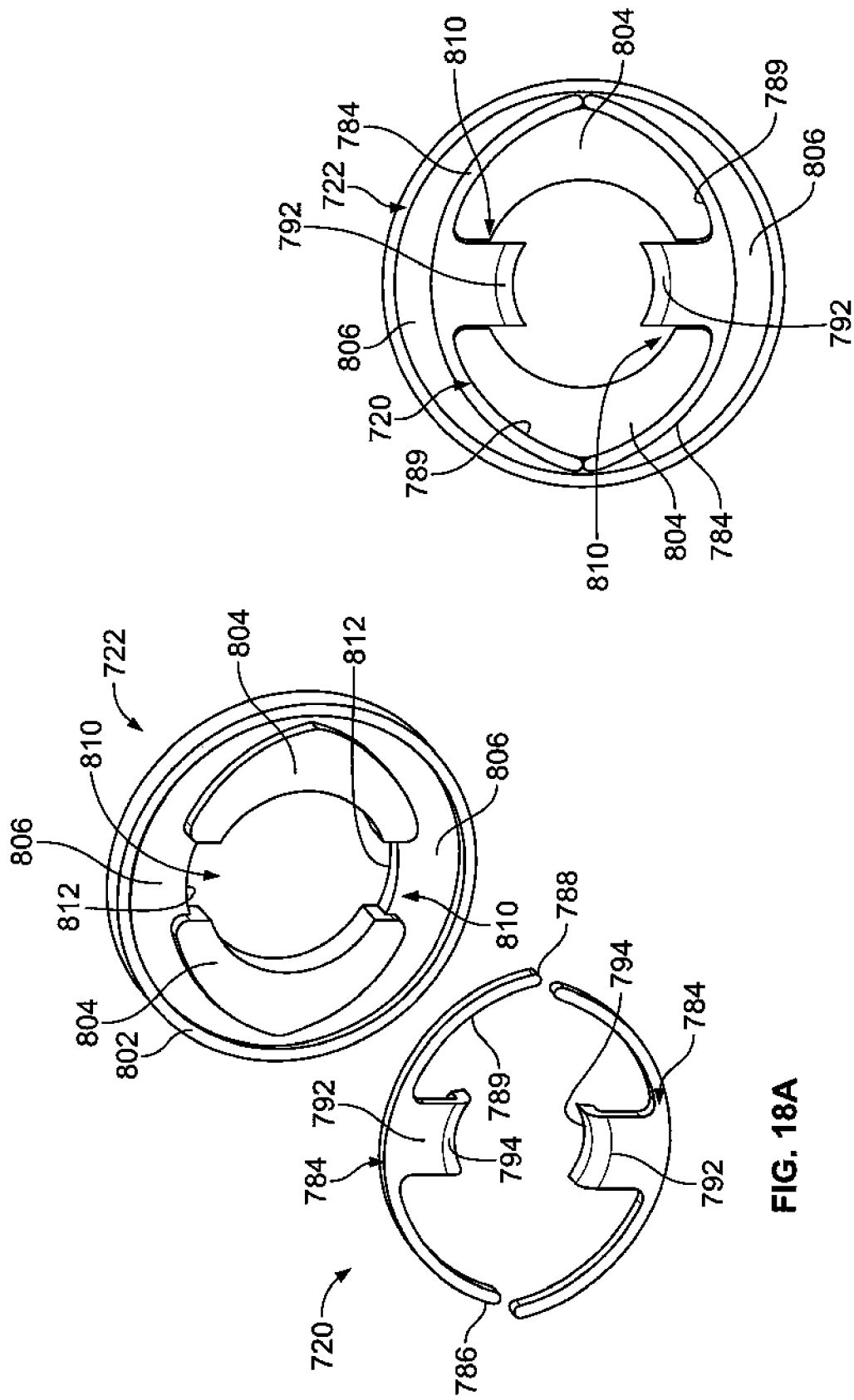
FIGS. 18A and 18B show another embodiment of a retainer ring and its associated housing.

FIGS. 18A and 18B show an embodiment of a retainer ring 720 and a housing 722. Referring to FIG. 18A, in an embodiment, the retainer ring 720 includes a pair of distinct curvilinear-shaped, cantilevered arms 784, each of which includes a first end 786 and a second end 788 opposite the first end 786, an inner surface 789, and a tab portion 792 extending from the inner surface 789 and positioned intermediate the first and second ends, 786, 788. In an embodiment, a pressure pad 794 extends from each of the tab portions 792. In an embodiment, the housing 722 includes a circular-shaped outer wall 802 and a pair of V-shaped circular-shaped inner walls 804 spaced apart from and concentric with the outer wall 802. In an embodiment, the outer and inner walls 802, 804 form a pair of crescent-shaped channels 806. In an embodiment, the inner wall 804 includes a pair of windows 810 extending therethrough. In an embodiment, each of the windows 810 includes a stop surface 812. Referring to FIG. 18B, in an embodiment, each of the arms 784 of the retainer ring 720 are housed within a corresponding one of the channels 806 of the housing 722. In this regard, the inner surface 789 of the arms 784 engage the inner walls 804, while each of tab portions 792 resides within a corresponding one of the windows 810.

In an embodiment, as a bolt (such as the bolt 12) engages the retainer ring 720, the arms 784 are displaced towards the outer wall 802 in order to enable the bolt 12 to travel within the retainer ring 720 (not shown in the Figures). In an embodiment, the arms 784 displace until the pressure pads 794 engage the stop surfaces 812 of the housing 722, so as to prevent the arms 784 from traveling too far and permanently deforming (not shown in the Figures). In an embodiment, as the bolt 12 is pushed into the retainer ring 720 and the pressure pads 794 engage and align with the annular groove 40 of the bolt 12, the arms 784 spring back to their free state positions. In this manner, the pressure pads 794 engage and reside within the annular groove 40 of the bolt 12, resulting in the bolt 12 being captivated.

FIGS. 19A and 19B show an embodiment of a retainer ring 920 and a housing 922. Referring to FIG. 19A, in an embodiment, the retainer ring 920 includes a pair of separate and distinct curvilinear-shaped, cantilevered arms 984, each of which includes a first end 986 having a hook member 987 and a second end 988 opposite the first end 986 having a tab portion 992 extending therefrom. In an embodiment, a pressure pad 994 extends from each of the tab portions 992. In an embodiment, the housing 922 includes a circular-shaped outer wail 1002 and a pair of arc-shaped inner walls 1004 spaced apart from the outer wall 1002. In an embodiment, the inner walls 1004 are offset from one another. In an embodiment, the outer and inner walls 1002, 1004 form a channel 1006. In an embodiment, the inner wall 1004 includes a pair of windows 1010 extending therethrough. In an embodiment, each of the windows 1010 includes a stop surface 1012. In an embodiment, a pair of diametrically opposed tabs 1003 extends from the inner surface of the outer wall 1002 and into the channel 1006. Referring to FIG. 19B, in an embodiment, each of the arms 984 of the retainer ring 920 are housed within the channel 1006 of the housing 922. In this regard, inner surfaces 989 of the arms 984 engage the inner walls 1004, while each of tab portions 992 resides within a corresponding one of the windows 1010. In an embodiment, each of the hook members 987 engages an end of a corresponding one of the inner walls 1004 and one of the tabs 1003 of the housing 922.

In an embodiment, when a bolt (such as the bolt 12) engages the retainer ring 920, the first ends 986 of the arms 984 are displaced and expand radially from a free state position to an expanded position in order to enable the bolt 12 to travel within the retainer ring 920 (not shown in the Figures). During the insertion of the bolt 12, the second ends 988 of the arms 984 are secured in place by the engagement of the hook members 987 of the retainer ring 920. In an embodiment, the arms 984 displace until the pressure pads 994 engage the stop surfaces 1012 of the housing 922, so as to prevent the arms 982 from traveling too far and permanently deforming (not shown in the Figures). In an embodiment, as the bolt 12 is pushed into the retainer ring 920 and the pressure pads 994 engage and align with an annular groove 40 of the bolt, 12 the arms 984 spring back to their free state positions. In this manner, the pressure pads 994 engage and reside within the annular groove 40 of the bolt 12, resulting in the bolt 12 being captivated.

Figure 20:
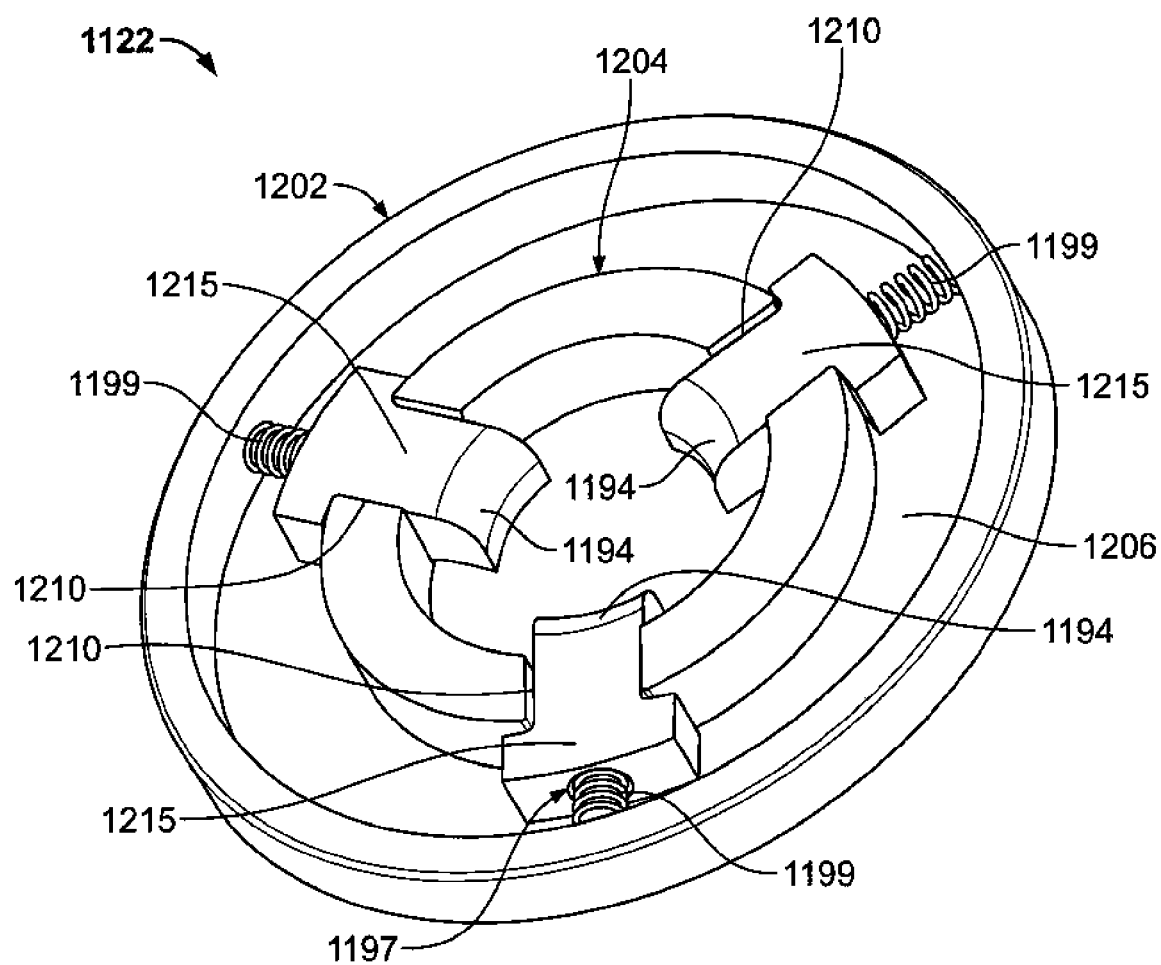
FIG. 20 is a top perspective view of another embodiment of a housing and sliding pawl retaining system.

FIG. 20 shows an embodiment of a housing 1122 which includes a circular-shaped outer wall 1202 and a circular-shaped inner wall 1204 spaced apart from the outer wall 1202. In an embodiment, the outer and inner walls 1202, 1204 form a channel 1206. In an embodiment, the inner wall 1204 includes a plurality of windows 1210 extending therethrough. In an embodiment, the housing 1122 includes a plurality of T-shaped pawls 1215 which are slidably positioned within the windows 1210. In an embodiment, each of the pawls 1215 includes a pressure pad 1194. In an embodiment, each of the pawls 1215 includes an aperture 1197 adapted to receive a spring 1199, which is positioned against an inner surface of the outer wall 1202.

In an embodiment, when a bolt (such as the bolt 12) engages the housing 1122, the pawls 1215 are displaced and slide outwardly towards the outer wall 1202 in order to enable the bolt 12 to travel within the housing 1122 (not shown in the Figures). In an embodiment, the pawls 1215 displace until the pawls 1215 engage the inner surface of the outer wall 1202 (not shown in the Figures). In an embodiment, as the bolt 12 is pushed into the housing 1122 and the pressure pads 1194 engage and align with the annular groove 40 of the bolt 12, the pawls 1215 spring back inwardly, and the pressure pads 1194 engage and reside within the annular groove 40 of the bolt 12, resulting in the bolt 12 being captivated (not shown in the Figures).

All such variations and modifications are intended to be included within the scope of the invention as defined in the appended claims.

What is claimed is:

1. A fastener, comprising:
 a bolt having an elongated shank portion adapted to be positioned within an opening of a work piece, the work piece having a first side and a second side opposite the first side, the elongated shank portion having a first end, a second end opposite the first end, a head formed at the first end, a threaded portion having a plurality of external bolt threads, the threaded portion being adapted to extend past the second side of the work piece, and an annular groove formed proximate to the second end;
 an upper grommet having a receptacle and a head extending from the receptacle, the head of the upper grommet having an exterior surface, an interior surface, and an annular pocket formed within the interior surface, wherein the upper grommet is adapted to be installed within the opening of the work piece;
 a lower grommet having a tubular portion with a first end and a second end opposite the first end of the tubular portion, a flared portion extending from the first end of the tubular portion, and a base member extending from the second end of the tubular portion, the base member including an interior portion, wherein the lower grommet is adapted to be installed within the upper grommet, such that the receptacle of the upper grommet is sized and shaped to receive the tubular portion of the lower grommet, and the annular pocket of the head of the upper grommet is sized and shaped to receive the flared portion of the lower grommet;
 a housing; and
 a retainer ring housed within the housing,
 wherein the interior portion of the base member of the lower grommet is sized and shaped to receive the housing and the retainer ring, and
 wherein the elongated shank portion of the bolt is adapted to be installed within the upper grommet and lower grommet, such that the retainer ring engages the annular groove of the bolt in order to captivate the bolt.

2. The fastener of claim 1, wherein the annular groove of the elongated shank portion of the bolt is defined by an annular portion that extends approximately perpendicular to a longitudinal axis of the bolt, and a ramped portion that extends angularly from the longitudinal axis of the bolt, wherein the annular portion inhibits the bolt from being decaptivated from the retainer ring.

3. The fastener of claim 2, wherein the retainer ring includes an outer ring having an exterior surface, and an interior surface, and at least one spring beam element extending from the interior surface of the outer ring, wherein when the bolt engages the retainer ring, the at least one spring beam element is displaced and expands radially from a free position to an expanded position in order to enable the bolt to travel through the retainer ring, and wherein when the retainer ring engages and aligns with the annular groove of the bolt, the at least one spring beam element springs back to its free position.

4. The fastener of claim 3, wherein the at least one spring beam element includes an elongated arm having a first end attached to the interior surface of the outer ring and a free, second end opposite the first end of the elongated arm, wherein the arm of the at least one spring beam element and the interior surface of the outer ring form a slot therebetween.

5. The fastener of claim 4, wherein the at least one spring beam element of the retainer ring includes a tab portion formed at the second end of the elongated arm.

6. The fastener of claim 5, wherein the housing includes an outer wall, an inner wall, a channel formed between the inner wall and the outer wall, and a centrally-located aperture, wherein the channel of the housing is sized and shaped to receive the retainer ring such that the exterior surface of the outer ring of the retainer ring is juxtaposed with the outer wall of the housing, and the at least one spring beam element of the retainer ring is juxtaposed with the inner wall of the housing.

7. The fastener of claim 6, wherein the at least one spring beam element includes a plurality of spring beam elements.

8. fastener of claim 7, wherein each of the elongated arms of the plurality of spring beam elements is curvilinear in shape.

9. The fastener of claim 7, wherein the housing includes a plurality of windows formed within the inner wall, wherein each of the plurality of windows includes a stop surface, and wherein each of the plurality of windows of the housing is sized and shaped to receive a corresponding one of the tab portions of the plurality of spring beam elements of the retainer ring.

10. The fastener of claim 9, wherein each of the tab portions of the retainer ring includes a pressure pad, wherein when the plurality of spring beam elements are in their expanded positions, each of the pressure pads contacts a corresponding one of the stop surfaces of the housing.

11. The fastener of claim 10, wherein each of the pressure pads extends perpendicular to its corresponding arm of one of the plurality of spring beam elements.

12. The fastener of claim 11, wherein each of the tab portions extends substantially perpendicular to and in the same plane as the free end of its corresponding arm of one of the plurality of spring beam elements.

13. The fastener of claim 12, wherein the base member of the lower grommet includes an annular compressive wall, wherein the annular compressive wall defines the interior portion of the base member, and wherein the annular compressive wall is adapted to be compressed about its periphery to encapsulate the retainer ring and the housing within the interior portion of the base member.

14. The fastener of claim 1, wherein the threaded portion of the bolt is adapted to receive a locking member.

15. The fastener of claim 1, wherein the threaded portion of the bolt includes external threads below the annular groove and proximate to the second end of the bolt.

16. The fastener of claim 1, wherein the annular groove of the bolt is coincident with the external bolt threads of the bolt.

17. The fastener of claim 1, wherein the work piece is a panel.

18. A fastener, comprising:
a bolt having an elongated shank portion adapted to be positioned within an opening of a work piece, the work piece having a first side and a second side opposite the first side, the elongated shank portion having a first end, a second end opposite the first end, a head formed at the first end, a threaded portion having a plurality of external bolt threads, the threaded portion being adapted to extend past the second side of the work piece, and an annular groove formed proximate to the second end;

a grommet having a receptacle, a head extending from one end of the receptacle, and a base member extending from an opposite end of the receptacle, the base member including an interior portion, wherein the grommet is adapted to be installed within the opening of the work piece;

a housing; and a retainer ring housed within the housing, wherein the interior portion of the base member of the grommet is sized and shaped to receive the housing and the retainer ring, and wherein the elongated shank portion of the bolt is adapted to be installed within the grommet, such that the retainer ring engages the annular groove of the bolt in order to captivate the bolt.

19. The fastener of claim 18, wherein the retainer ring includes an outer ring having an interior surface and at least one spring beam element extending from the interior surface, wherein when the bolt engages the retainer ring, the at least one spring beam element is displaced and expands radially from a free position to an expanded position in order to enable the bolt to travel through the retainer ring, and wherein when the retainer ring engages and aligns with the annular groove of the bolt, the at least one spring beam element springs back to its free position.

* * * * *

UNITED STATES PATENT AND TRADEMARK OFFICE
CERTIFICATE OF CORRECTION

PATENT NO. : 8,506,224 B2  Page 1 of 1
APPLICATION NO. : 13/159584
DATED : August 13, 2013
INVENTOR(S) : Frank Cosenza et al.

It is certified that error appears in the above-identified patent and that said Letters Patent is hereby corrected as shown below:

In the Specifications:

Column 3, line 1, delete "198" and insert -- 19B --;

Column 6, line 66, after "can" insert -- be --;

Column 10, line 53, delete "wail" and insert -- wall --.

Signed and Sealed this
Fourth Day of February, 2014

Michelle K. Lee
*Deputy Director of the United States Patent and Trademark Office*